(12) United States Patent
Takahashi

(10) Patent No.: US 9,774,413 B2
(45) Date of Patent: Sep. 26, 2017

(54) COMMUNICATION APPARATUS, COMMUNICATION SYSTEM, AND COMMUNICATION CONTROLLING METHOD TO SYNCHRONIZE CLOCK PROCESS

(71) Applicant: Sony Corporation, Tokyo (JP)

(72) Inventor: Hiroaki Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/406,337

(22) PCT Filed: May 8, 2013

(86) PCT No.: PCT/JP2013/002945
§ 371 (c)(1),
(2) Date: Dec. 8, 2014

(87) PCT Pub. No.: WO2013/186981
PCT Pub. Date: Dec. 19, 2013

(65) Prior Publication Data
US 2015/0163003 A1 Jun. 11, 2015

(30) Foreign Application Priority Data
Jun. 16, 2012 (JP) ................................. 2012-136457

(51) Int. Cl.
| | |
|---|---|
| H04L 29/08 | (2006.01) |
| H04J 3/06 | (2006.01) |
| H04N 5/04 | (2006.01) |
| H04N 21/242 | (2011.01) |
| H04N 5/232 | (2006.01) |

(52) U.S. Cl.
CPC .......... *H04J 3/0682* (2013.01); *H04J 3/0602* (2013.01); *H04J 3/0667* (2013.01); *H04L 67/1095* (2013.01); *H04N 5/04* (2013.01); *H04N 21/242* (2013.01); *H04N 5/23203* (2013.01)

(58) Field of Classification Search
None
See application file for complete search history.

(56) References Cited

U.S. PATENT DOCUMENTS 4,361,890 A * 11/1982 Green, Jr. ................ H04B 1/69
370/350
6,002,710 A * 12/1999 Hendrickson ............. H04L 1/24
370/324
6,377,575 B1 * 4/2002 Mullaney .............. H04J 3/0685
370/360
8,599,881 B2 * 12/2013 Wolfe ................... H04J 3/0661
370/395.62

(Continued)

*Primary Examiner* — Hassan Kizou
*Assistant Examiner* — Hashim Bhatti
(74) *Attorney, Agent, or Firm* — Chip Law Group

(57) ABSTRACT

Techniques for synchronizing a clock of a first apparatus and a clock of a second apparatus in communication with the first apparatus via a network. The techniques include communicating first data between the first apparatus and second apparatus via a network, communicating, while at least a portion of the first data is being communicated via the network, a synchronization packet between the first apparatus and the second apparatus, and communicating second data between the first apparatus and the second apparatus after synchronization between the first apparatus and the second apparatus has been established.

19 Claims, 13 Drawing Sheets

(56) References Cited

U.S. PATENT DOCUMENTS

| | | | | |
|---|---|---|---|---|
| 2003/0236841 | A1* | 12/2003 | Epshteyn | H04L 69/16 |
| | | | | 709/206 |
| 2006/0072624 | A1* | 4/2006 | Akita | H04L 12/437 |
| | | | | 370/503 |
| 2006/0239458 | A1* | 10/2006 | Bicksler | H04L 9/12 |
| | | | | 380/221 |
| 2008/0159748 | A1* | 7/2008 | Sone | H04Q 11/0005 |
| | | | | 398/154 |
| 2008/0240072 | A1* | 10/2008 | Bykovnikov | H04B 7/269 |
| | | | | 370/350 |
| 2011/0261917 | A1* | 10/2011 | Bedrosian | H04J 3/0667 |
| | | | | 375/371 |
| 2012/0016993 | A1* | 1/2012 | Kisel | H04L 12/5695 |
| | | | | 709/226 |
| 2012/0069944 | A1* | 3/2012 | Hadzic | H04J 3/0667 |
| | | | | 375/376 |
| 2013/0034197 | A1* | 2/2013 | Aweya | H04J 3/0664 |
| | | | | 375/362 |

* cited by examiner

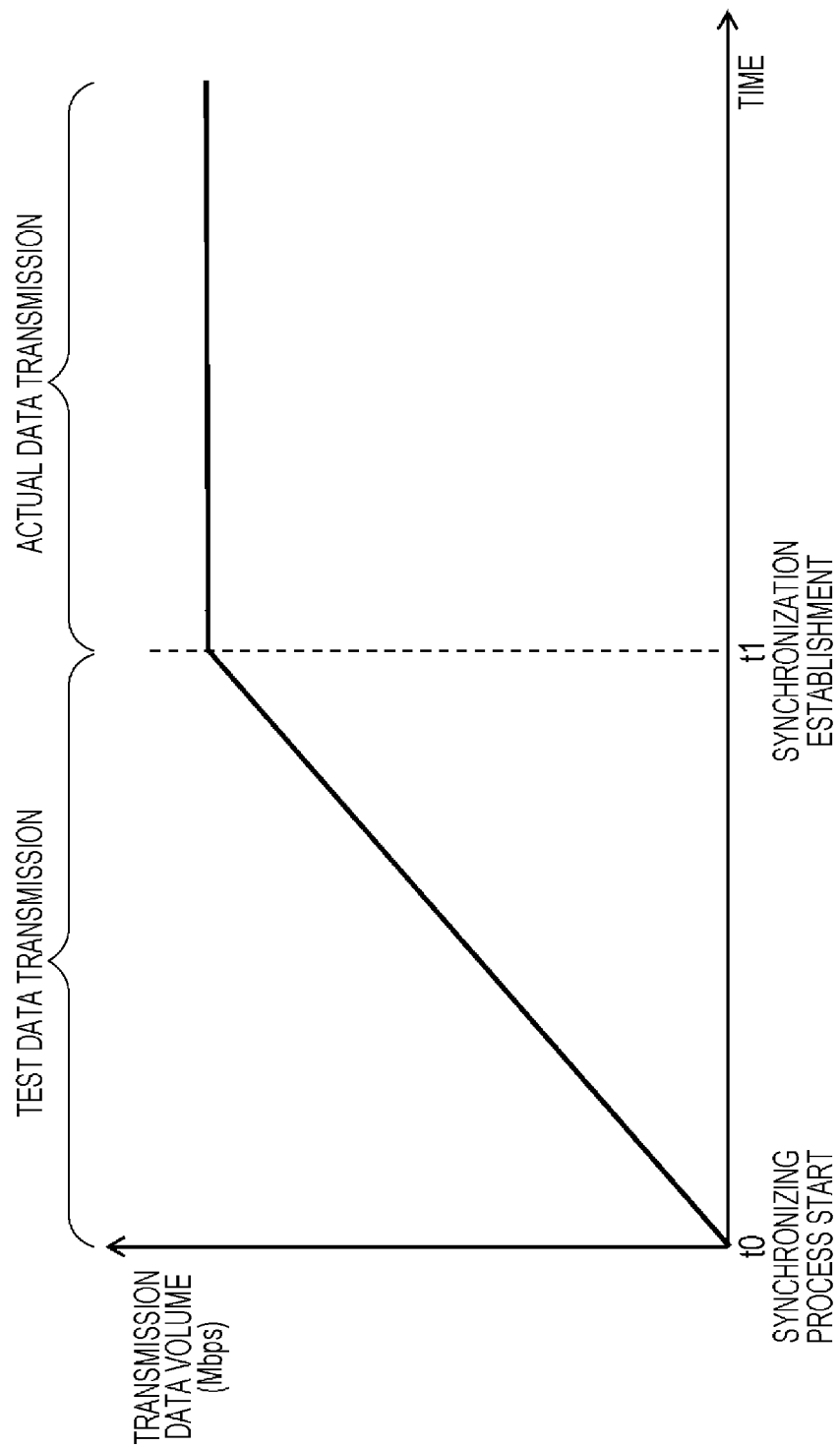

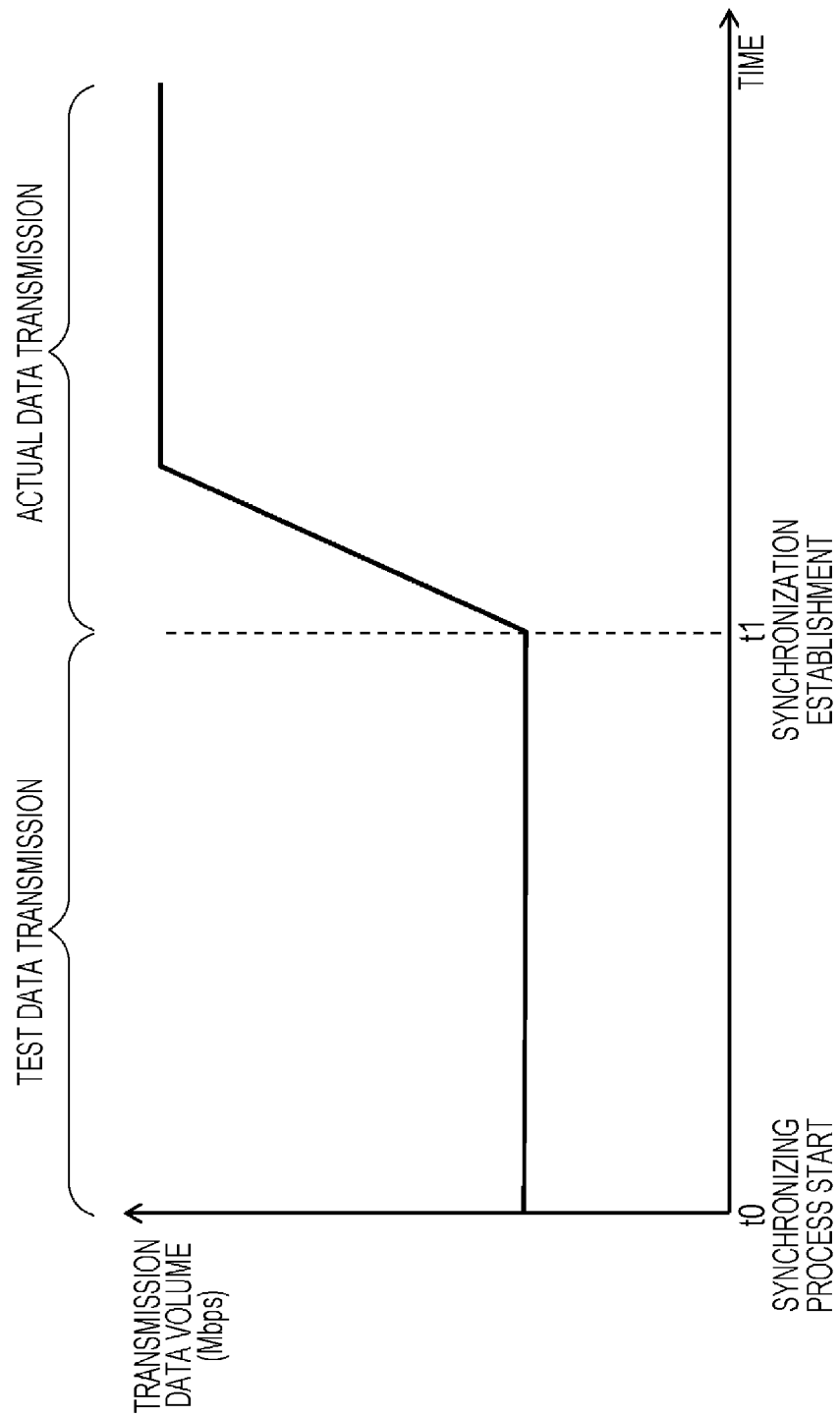

COMMUNICATION APPARATUS, COMMUNICATION SYSTEM, AND COMMUNICATION CONTROLLING METHOD TO SYNCHRONIZE CLOCK PROCESS

TECHNICAL FIELD

The present disclosure relates to a communication apparatus, a communication system, a communication controlling method, and a program. In particular, the present disclosure relates to a communication apparatus, a communication system, a communication controlling method, and a program that execute a clock synchronizing process between multiple apparatuses connected to each other via a network.

BACKGROUND ART

For example, if contents used for a television broadcast are generated, a process that generates the contents used for the broadcast is executed by transmitting images captured by multiple video cameras disposed at multiple different positions are transmitted to an editing studio via a network, and by executing an editing process which generates an image or the like in which multiple images are combined or one image is selected from images captured by multiple cameras in an editing apparatus in the editing studio.

In such an editing process, it is necessary to exactly discriminate what timing each image is captured individually by each camera. As information for this, a time stamp indicating a capturing time or the like is set in the image captured by each camera, and the editing apparatus executes the editing process with reference to the time stamp, thereby enabling the image captured by each camera to be edited without any time difference.

However, the time stamp is set by using a clock signal generated by a clock embedded in each apparatus connected via a network. If there is a phase difference or a frequency difference in the clock signal of apparatuses connected via the network, a difference occurs in the time stamp set in each apparatus.

In order to correct the clock signal difference between apparatuses connected via the network, a clock synchronizing process which transmits and receives a synchronization packet between the devices connected via the network is executed. For example, PTL 1 (Japanese Unexamined Patent Application Publication No. 2010-190635) in the related art discloses the synchronizing process between multiple communication apparatuses connected via a packet transmission network such as Ethernet (a registered trademark).

PTL 1 discloses a configuration where the clock synchronizing process is executed between a master and a slave by transmitting and receiving a packet between a master apparatus and a slave apparatus that execute the synchronizing process, and performing an analysis to which transmission time information and reception time information which are recorded in the received packet is applied.

However, in a communication process via the network, a communication delay occurs. This delay amount is not constant and varies depending on network load situations. In other words, jitter which is a fluctuation of delay time occurs. For example, the synchronizing process by synchronization packet transmission and reception such as that described in the above-described PTL 1 can be executed with high precision when the network delay is constant, but when such jitter occurs, there is a problem that it is difficult to execute a highly precise synchronizing process.

CITATION LIST

Patent Literature

PTL 1: Japanese Unexamined Patent Application Publication No. 2010-190635

SUMMARY

Technical Problem

It is desirable to provide a communication apparatus, a communication system, a communication controlling method, and a program that enable an efficient clock synchronizing process to be executed between multiple communication apparatuses. In addition, it is desirable to provide a communication apparatus, a communication system, a communication controlling method, and a program that enables communication of actual data such as image data to be started between the communication apparatuses that have established early synchronization by completing the clock synchronizing process in a short time when a system is activated, for example.

Solution to Problem

Accordingly, some embodiments are directed to a first apparatus. The first apparatus comprises at least one processor programmed to communicate first data between the first apparatus and second apparatus via a network. The at least one processor further being programmed to communicate, while at least a portion of the first data is being communicated via the network, a synchronization packet between the first apparatus and the second apparatus, and communicate second data between the first apparatus and the second apparatus after synchronization between the first apparatus and the second apparatus has been established.

Other embodiments are directed to a first apparatus. The first apparatus comprises a network interface configured to communicate with a second apparatus via a network, and at least one processor. The at least one processor is programmed to transmit first data to the second apparatus via the network interface, communicate, while at least a portion of the first data is being transmitted, a synchronization packet between the first apparatus and the second apparatus via the network interface, and transmit second data to the second apparatus after synchronization between the first apparatus and the second apparatus has been established.

Still other embodiments are directed to a first apparatus. The first apparatus comprising a network interface configured to communicate with a second apparatus via a network, and at least one processor. The at least one processor is programmed to receive, via the network interface, first data sent from the slave apparatus, communicate, while at least a portion of the test data is being received via the network interface, a synchronization packet between the first apparatus and the second apparatus, and receive second data from the second apparatus after synchronization between the first apparatus and the second apparatus has been established.

Still other embodiments are directed to a method of synchronizing a clock of a first apparatus and a clock of a second apparatus in communication with the first apparatus via a network. The method comprises transmitting first data from the first apparatus to the second apparatus via the network, communicating, while at least a portion of the first data is being transmitted, a synchronization packet between the first apparatus to the second apparatus via the network, and transmitting second data from the first apparatus to the second apparatus after synchronization between the first apparatus and the second apparatus has been established.

Still other embodiments are directed to a method of synchronizing a clock of a first apparatus and a clock of a second apparatus in communication with the first apparatus via a network. The method comprises receiving, by the first apparatus, first data sent from the second apparatus via the network, communicating, while at least a portion of the first data is being received, a synchronization packet between the first apparatus and the second apparatus via the network, and receiving second data from the second apparatus after synchronization between the first apparatus and the second apparatus has been established.

Furthermore, for example, the program of the present disclosure is the program that can be provided by a storage medium and a communication medium provided in a computer-readable form, with respect to an information processing apparatus or a computer system that can execute various program codes. Such a program is provided in the computer-readable form, and thereby the process according to the program on the information processing apparatus or the computer system may be realized.

Still other object, features or advantages of the present disclosure will become apparent by a detailed description with reference to the attached drawings and the embodiments of the present disclosure described below. Furthermore, the system in the present specification is a logical collection configuration of multiple apparatuses, and the apparatuses with the respective configurations are not all limited to be accommodated in the same housing.

Advantageous Effects of Invention

According to the configuration of the embodiments of the present disclosure, an efficient clock synchronizing process is realized between communication apparatuses via a network. Specifically, the clock synchronizing process is executed as follows between a first communication apparatus and a second communication apparatus communicating with each other via the network. In other words, the first communication apparatus executes the clock synchronizing process accompanied by a synchronization packet transmission and reception with the second communication apparatus during a non-transmission period of actual data such as image contents scheduled to be transmitted to the second communication apparatus. The second communication apparatus executes the clock synchronizing process to which the synchronization packet is applied during a non-reception period of the actual data, and transmits a notification packet denoting synchronization establishment to the first communication apparatus after synchronization is established. The first communication apparatus starts transmission of the actual data such as the image contents with respect to the second communication apparatus according to the notification packet reception from the second communication apparatus. This configuration enables the synchronizing process to be executed in a stable situation with less network load and less network delay fluctuation (jitter).

BRIEF DESCRIPTION OF DRAWINGS

FIG. 13 is a view illustrated with regard to the example of a variation resulting from a time trend of the transmission data volume in the clock synchronizing process according to the present disclosure.

FIG. 14 is a view illustrated with regard to an example of a variation resulting from a time trend of the transmission data volume in the clock synchronizing process according to the present disclosure.

DESCRIPTION OF EMBODIMENTS

Hereinafter, a communication apparatus, a communication system, a communication controlling method and a program of the present disclosure will be described in detail with reference to the drawings. Furthermore, the description will be made according to the following items.

1. With Regard to Summary of Clock Synchronizing Process using Synchronization Packet
2. With Regard to Jitter in Network Communication
3. With Regard to First Embodiment of Synchronizing Process according to Present Disclosure
4. With Regard to Second Embodiment of Synchronizing Process according to Present Disclosure
5. With Regard to Other Embodiment
6. Summary of Configuration of Present Disclosure 1. With Regard to Summary of Clock Synchronizing Process Using Synchronization Packet First, the summary of the clock synchronizing process using the synchronization packet will be described. Hereinafter, a clock synchronization sequence specified in IEEE1588 will be described as an example of the clock synchronizing process using the synchronization packet.

Figure 1:
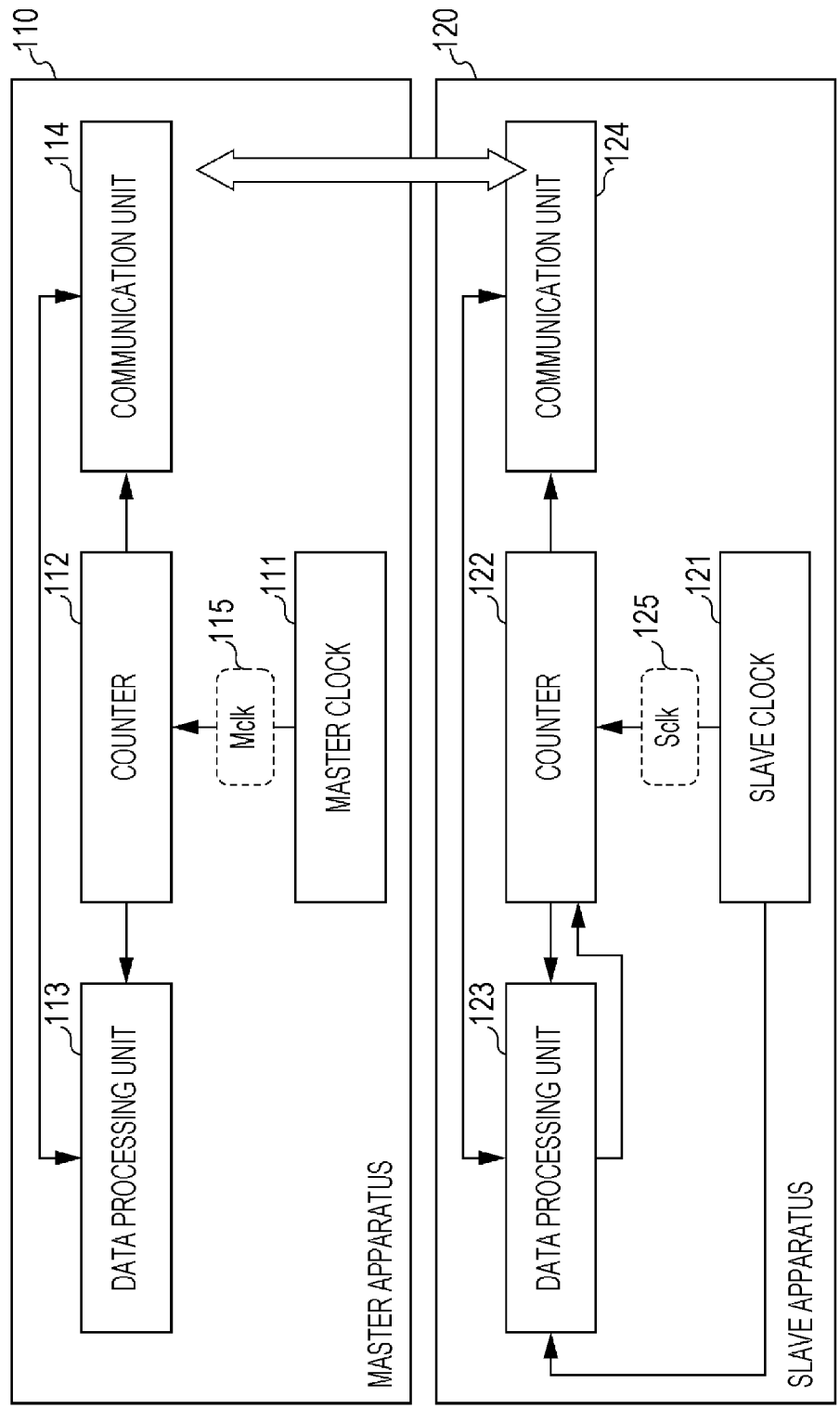
FIG. 1 is a view illustrated with regard to a configuration and a process of a communication apparatus that executes a clock synchronization process.

FIG. 1 illustrates a master apparatus 110 and a slave apparatus 120 as two apparatuses which execute the clock synchronization process. The master apparatus 110 and the slave apparatus 200 transmit and receive a packet via an IP communication network such as Ethernet (a registered trademark) which is an asynchronous transmission network. For example, one specific example is that the slave apparatus 120 is a video camera and the master apparatus 110 is an editing apparatus which performs an editing process by receiving an image of the video camera.

The master apparatus 110 includes a master clock 111, a counter 112, a data processing unit 113 and a communication unit 114. The master clock 111 generates a master clock signal (Mclk) 115 and outputs the generated clock signal to the counter 112. The counter 112 generates a counter value based on the master clock signal (Mclk) 115 input from the master clock 111 and outputs the counter value to the data processing unit 113.

The data processing unit 113 inputs the counter value generated by the counter 112 and executes various data processes based on the counter value. For example, the data processing unit 113 executes a process for the clock synchronization process, further the process depending on the apparatus, an acquisition process of video camera capturing data if the master apparatus 110 is the video camera, for example, a time stamp setting process based on the counter value, or the like. In addition, if the master apparatus 110 is the editing apparatus which edits contents received from a slave apparatus which is the video camera, the master apparatus 110 executes a content editing process or the like using the time stamp set in the content.

For example, the data processing unit 113 is configured by a CPU having a program execution function, a memory which stores the program, data, various parameters or the like, or the like. The communication unit 114 executes a packet transmission and reception with the slave apparatus 120.

The slave apparatus 120 includes a slave clock 121, a counter 122, a data processing unit 123 and a communication unit 124. The slave clock 121 generates a slave clock signal (Sclk) 125 and outputs the generated clock signal to the counter 122. The counter 122 generates a counter value based on the slave clock signal (Sclk) 125 input from the slave clock 121 and outputs the counter value to the data processing unit 123.

The data processing unit 123 inputs the counter value generated by the counter 122 and executes various data processes based on the counter value. For example, the data processing unit 123 executes the process for the clock synchronization process, further the process depending on the apparatus, the acquisition process of the video camera capturing data if the slave apparatus 120 is the video camera, for example, the time stamp setting process based on the counter value, or the like. In addition, if the slave apparatus 120 is the editing apparatus which edits contents receiving from the slave apparatus which is the video camera, the master apparatus 110 executes the content editing process or the like using the time stamp set in the contents.

For example, the data processing unit 123 is configured by the CPU having the program execution function, the memory which stores the program, the data, the various parameters or the like. The communication unit 124 executes the packet transmission and reception with the master apparatus 110.

Figure 2:
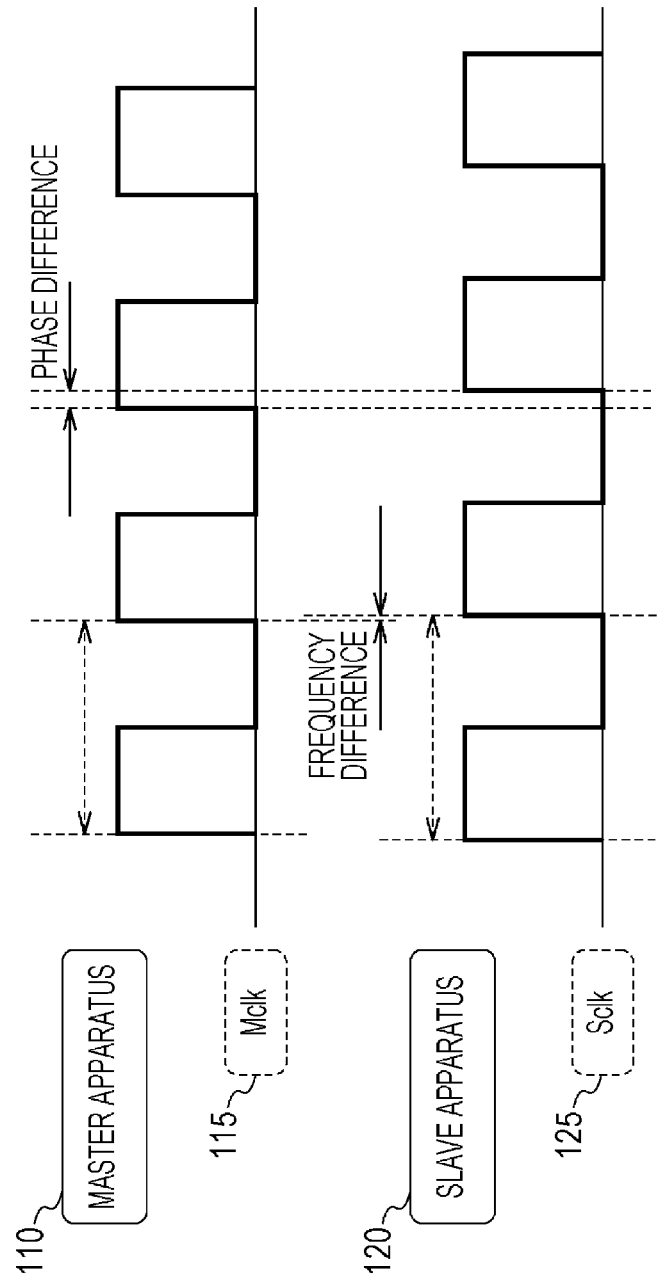
FIG. 2 is a view illustrated with regard to a specific example of the clock synchronization process.

Here, the clock signal (Mclk) generated by the master clock 111 in the master apparatus 110 and the clock signal (Sclk) generated by the slave clock 121 in the slave apparatus 120 are not limited to be synchronized with each other. In other words, in general, a frequency difference or a phase difference occurs as illustrated in FIG. 2.

When data communication is executed between the master apparatus 110 and the slave apparatus 120 which have such unsynchronized clocks, there is a case where the clock synchronizing process has to be executed. In other words, in a case where the data editing or the like is executed based on the time stamp described above, the clock synchronization is desired.

In the clock synchronization process, there are various methods, but, for example, there is one clock synchronization processing sequence specified in IEEE 1588. Hereinafter, the clock synchronization processing sequence in the IEEE1588 will be described. In the clock synchronization according to the IEEE1588 sequence, the master apparatus 110 transmits a PTP (Precision Time Protocol) message to the slave apparatus 220.

For example, the PTP message is a message packet containing message transmission time information or the like. Furthermore, for example, the time information uses a value in which the counter value set by the counter 112 of the master apparatus 110 is converted into a nano second (ns: nano second) unit value that is the time information. Because of the converting process, the data processing unit 113 of the master apparatus 110 includes a function which converts the counter value into the time information value of the nano second (ns) unit.

In a synchronization packet transmitting process of one unit, the following messages, in other words, a synchronization message (Sync) and a delay response message (DelayResponse) are included in the PTP message that the master apparatus 110 transmits to the slave apparatus 120.

The synchronization message (Sync) is a message which contains the time information for executing the time synchronization. The master apparatus 110 continuously transmits multiple synchronization messages (Sync). Furthermore, there is a case where the synchronization message (Sync) subsequent to a preceding synchronization message (Sync) is called a follow-up message. The delay response message is a message transmitted as a response after a delay request (DelayRequest) message is received from the slave apparatus 220, and a message which contains reception time information on the delay request (DelayRequest) message received from the slave apparatus 220.

The slave apparatus 120 receives the PTP message from the master apparatus 110 and transmits the PTP message generated by the slave apparatus 120 to the master apparatus 110. The PTP message which the slave apparatus 120 transmits to the master apparatus 110 is the delay request (DelayRequest) message. The delay request message is transmitted to the master apparatus 110 in order to request the delay request message, after the synchronization message (Sync) is received from the master apparatus 210.

Figure 3:
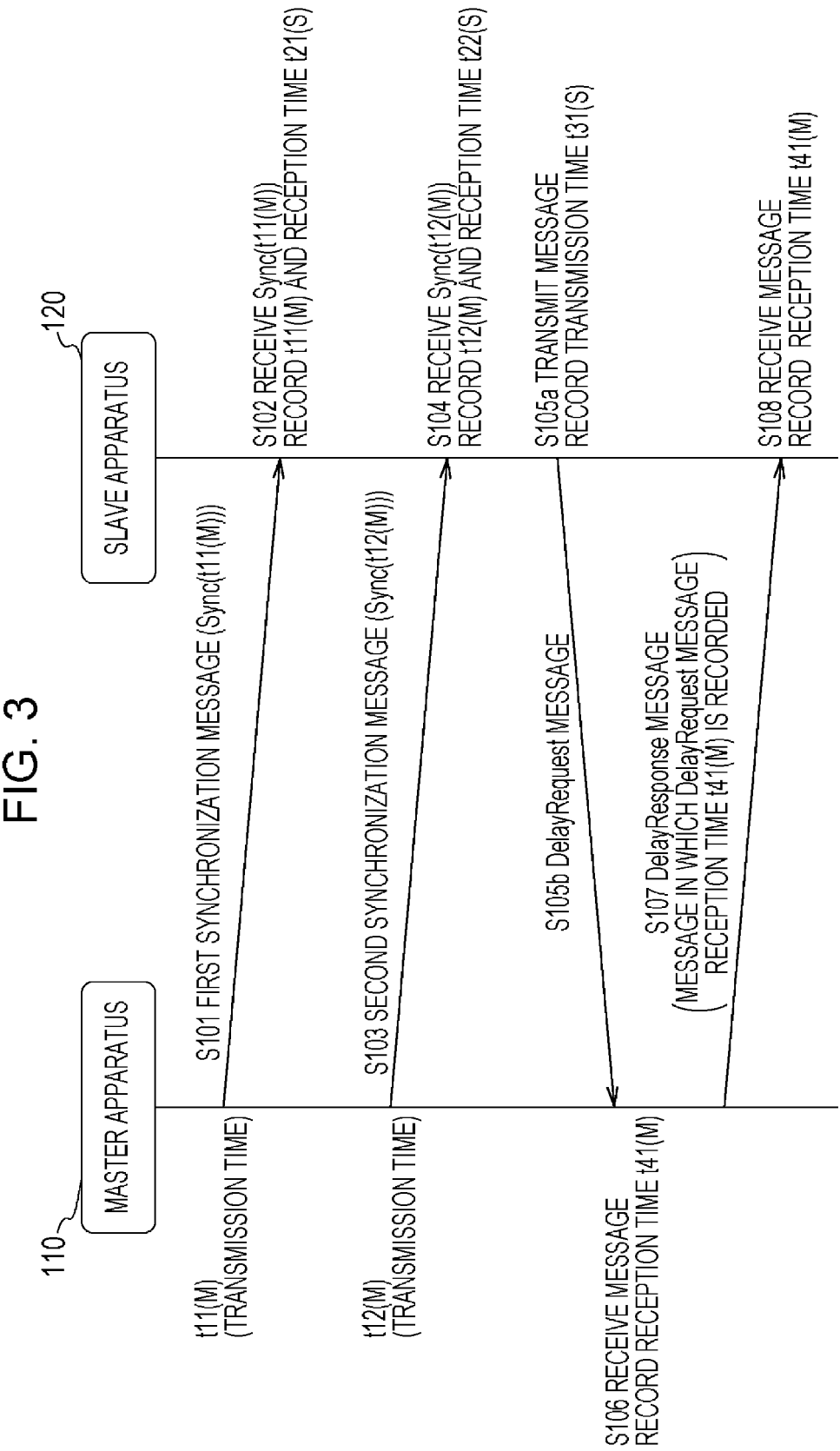
FIG. 3 is a view illustrated with regard to a communication sequence in the clock synchronizing process executed between the communication apparatus.

FIG. 3 is a sequence diagram illustrating the clock synchronization processing sequence between the master apparatus 110 and the slave apparatus 120 illustrated in FIG. 1. Each process of steps S101 to S108 will be described.

(Step S101)

A first synchronization message (Sync(t11)) is transmitted from the master apparatus 110 to the slave apparatus 220. A transmission time t11 of the first synchronization message is contained in the first synchronization message (Sync (t11)). This is the time information (t11(M)) on the master clock (Mclk) base. Hereinafter, in each time information (txy), (M) is additionally described in the time information in which the master clock is measured as a reference clock, and (S) is additionally described in the time information in which the slave clock is measured as the reference clock.

(Step S102)

The slave apparatus 120 receives the first synchronization message (Sync(t11(M))) transmitted from the master apparatus 110, and records message transmission time information (t11(M)) contained in the received first synchronization message (Sync (t11(M))) and the message reception time, in other words, reception time information (t21(S)) on a slave clock (Sclk) base, in the memory.

(Step S103)

A second synchronization message (Sync(t12(M))) is further transmitted from the master apparatus 110 to the slave apparatus 220. A transmission time t12 of the second synchronization message is also contained in the synchronization message (Sync(t12(M))). This is the time information (t12(M)) on the master clock (Mclk) base.

(Step S104)

The slave apparatus 120 receives the second synchronization message (Sync(t12(M))) transmitted from the master apparatus 110, and records message transmission time information (t12(M)) contained in the received synchronization message (Sync(t12(M))) and the message reception time, in other words, reception time information (t22(S)) on the slave clock (Sclk) base, in the memory.

(Step S105a and 105b)

Next, the delay request message (DelayRequest) is transmitted from the slave apparatus 120 to the master apparatus 110. The slave apparatus 120 records an issue (transmission) time t31(S) of the delay request message in the memory as time information (t31(S)) on a slave clock (Sclk) base.

(Step S106)

The master apparatus 110 receives the delay request message transmitted from the slave apparatus 120, and records a reception time t41(M) of the delay request message, in other words, time information (t41(M)) on the master clock (Mclk) base, in the memory.

(Step S107)

Next, the delay request message (DelayRequest) is transmitted from the master apparatus 110 to the slave apparatus 120. A reception time t41 of the above-described delay request message, in other words, the time information (t41 (M)) on the master clock (Mclk) base is contained in the delay response message.

(Step S108)

The slave apparatus 120 receives the delay request message transmitted from the master apparatus 110, obtains the reception time t41(M) of the delay request message, in other words, the time information (t41(M)) on the master clock (Mclk) base, and records that in the memory.

The following items of time information are recorded in the memory of the slave apparatus 120 by the associated process.

(1) t11(M): the time information on the master clock (Mclk) base indicating the transmission time of the first synchronization message, (2) t21(S): the time information on the slave clock (Sclk) base indicating the reception time of the first synchronization message, (3) t12(M): the time information on the master clock (Mclk) base indicating the transmission time of the second synchronization message, (4) t22(S): the time information on the slave clock (Sclk) base indicating the reception time of the second synchronization message, (5) t31(S): the time information on the slave clock (Sclk) base indicating the transmission time of the delay request message, (6) t41(M): the time information on the master clock (Mclk) base indicating the reception time of the delay request message, The data processing unit 123 in the slave apparatus 120 calculates a frequency difference (drift) and a phase difference (offset) between the master clock signal (Mclk) generated by the master clock 111 in the master apparatus 110 and the slave clock signal (Sclk) generated by the slave clock 121 in the slave apparatus 120 by applying the pieces of time information, and executes the clock synchronizing process based on the calculated the frequency difference (drift) and the phase difference (offset).

Specifically, for example, the data processing unit 123 in the slave apparatus 120 outputs a correction signal to the counter 122, and corrects the counter value based on the slave clock signal (Sclk) generated by the slave clock 121 so as to be the same as the counter value based on the signal synchronized to the master clock. By this process, a difference between the slave clock 121 and the master clock 111 is corrected, and the synchronization is established.

Furthermore, the processes of steps S101 to S108 illustrated in FIG. 3 illustrate one unit of process sequence in a synchronizing process algorithm, during an execution period of the communication process, the processes of steps S101 to S108 are repeatedly executed, and the process which maintains synchronization of each communication apparatus is executed between actual communication apparatuses. For example, with respect to a slave from a master, synchronization message packets of 64 packets per second are continuously transmitted, and the process which maintains the synchronization between two communication apparatuses (the master and the slave) is executed by the control process using the packets.

Furthermore, in the synchronizing process executed by the data processing unit 123 in the slave apparatus 120, for example, the following process is executed. The data processing unit 123 generates a control voltage depending on a difference amount between the slave clock 121 and the master clock 111, outputs the control voltage to a VCO (Voltage Controlled Oscillator), and inputs the VCO output to the counter 122, thereby executing a servo process or the like, in other words, performing a PID control of a count process of the counter 122.

Furthermore, the frequency difference (drift) and the phase difference (offset) are calculated according to the following calculation equations (Equation 1) and (Equation 2).

$$\text{frequency drift (drift)} = (t12(M) - t11(M)) - (t22(S) - t21(S)) \quad \text{(Equation 1)}$$

$$\text{phase offset (offset)} = \{(t22(S) - t12(M)) - (t41(M) - t31(S))\}/2 \quad \text{(Equation 2)}$$

The data processing unit 123 in the slave apparatus 120 calculates the frequency difference (drift) and the phase difference (offset) between the master clock (Mclk) and the slave clock (Sclk) according to the calculation equations (equation 1) and (equation 2), and generates the correction signal based on the calculation result. The correction signal is input to the counter 122, and the counter value generated on the basis of the slave clock (Sclk) is controlled, and thereby the synchronization process is executed. Furthermore, the synchronizing processes are continuously executed during the data communication period between the master and the slave.

2. With Regard to Jitter in Network Communication

As described above, the synchronizing process between the communication apparatuses connected to each other via the network is executed by the transmission and reception of multiple message packets such as the synchronization message via the network.

However, in the communication via the network, delay occurs due to various factors. A delay amount varies depending on a network situation, for example, an increased or decreased communication load. In other words, in the network communication, a fluctuation of the delay amount, so-called jitter (Jitter) occurs. The synchronizing process by the synchronization packet transmission and reception is executed without any problem when the communication delay is constant without such jitter (Jitter), but when jitter (Jitter) occurs, it is difficult to execute a precise synchronization process.

Figure 4:
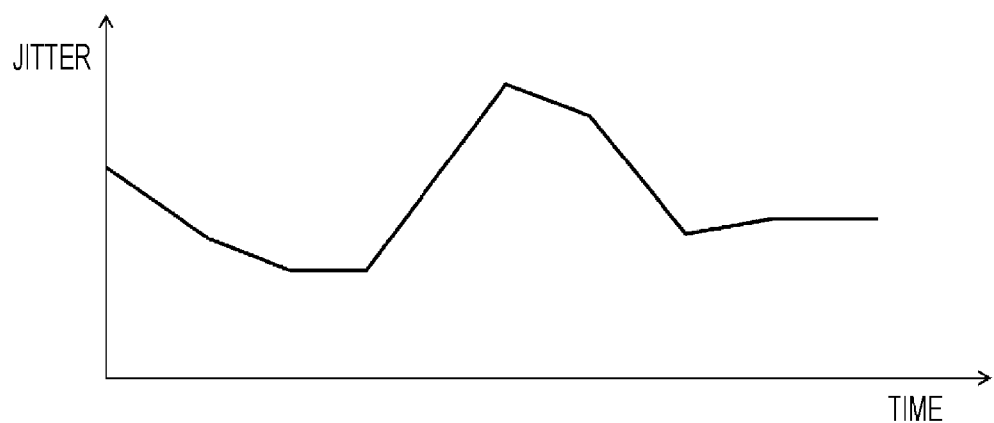
FIG. 4 is a view illustrated with regard to an example of jitter which is a delay fluctuation of a network.

FIG. 4 is a view illustrating a concept of time variation of the jitter. A horizontal axis indicates the time and a vertical axis indicates the jitter. In other words, the variation resulting from the time trend of the network delay amount is illustrated. As illustrated in FIG. 4, the delay amount of an IP network which is an asynchronous transmission network varies moment to moment.

A main factor of the network delay is an increase and decrease of the data transmission amount via the network. For example, when an image and audio data obtained by a capturing process of the video camera are transmitted via the network, compression data is generated by executing a coding process such as MPEG coding according to a predetermined algorithm, and the process that transmits the generated compression data is executed. The data mount of the data generated by the compression process significantly varies depending on a complexity degree of the image which is subject to compression process. As a result, the transmission data volume per unit time, specifically, a transmission bit amount (bps) per unit time significantly varies with the elapse of time. Specifically, as shown in a graph of FIG. 5, for example, the data transmission rate varies with the elapse of time.

Figure 5:
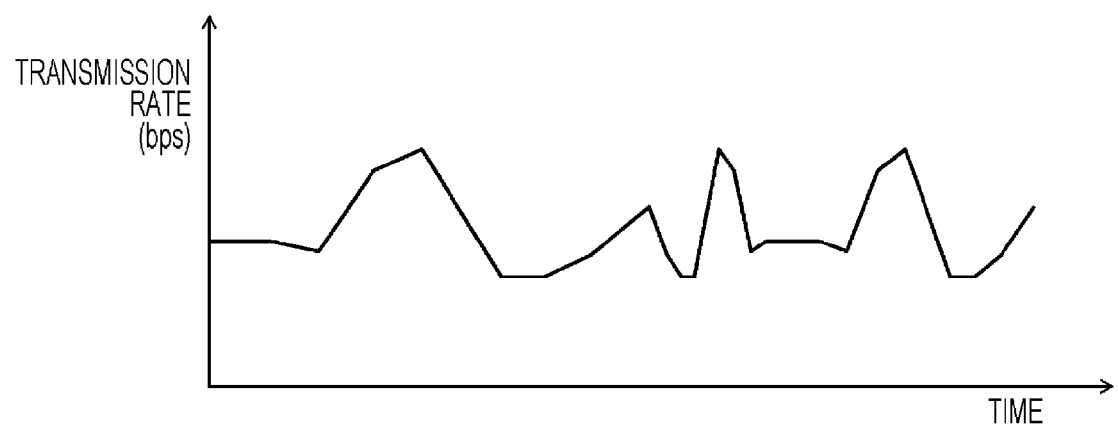
FIG. 5 is a view illustrated with regard to an example of a variation resulting from a time trend of communication data volume on the network.

FIG. 5 is the graph illustrating time denoted on the horizontal axis and the data transmission rate (bps) denoted on the vertical axis. If such transmission rate varies with the elapse of time, the fluctuation (jitter) of the above-described network delay is likely to occur. If jitter occurs, it is difficult to accurately execute the synchronizing process accompanied by the synchronization packet transmission and reception previously described, and it causes problems desiring a long time until a stable synchronization is achieved.

Figure 6:
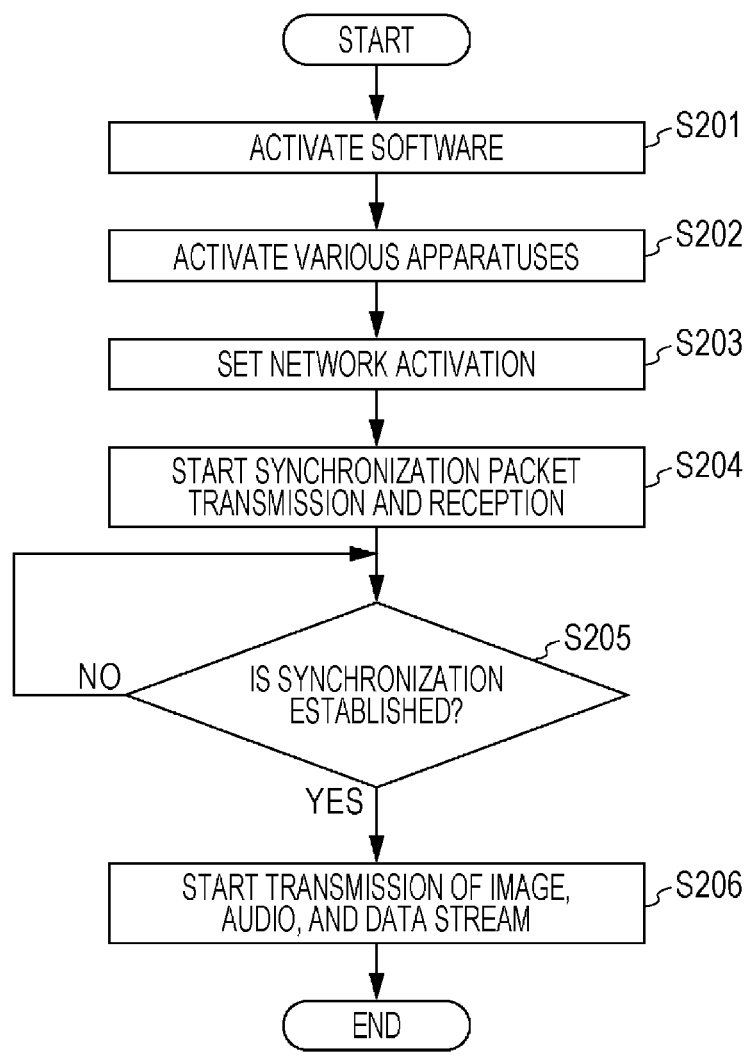
FIG. 6 is a view illustrating a flowchart described with regard to an example of a process sequence of the clock synchronizing process according to the present disclosure.

3. With Regard to First Embodiment of Synchronizing Process According to Present Disclosure Next, the first embodiment of the synchronizing process according to the present disclosure will be described. FIG. 6 is a flowchart illustrating a processing sequence executed in the two communication apparatuses which execute the clock synchronization process, for example, the master apparatus 110 and the slave apparatus 120 illustrated in FIG. 1.

For example, the process according to the flow illustrated in FIG. 6 is executed in each data processing unit of the master apparatus 110 and the slave apparatus 120 illustrated in FIG. 1. For example, the data processing unit of each apparatus obtains the program in which the process sequence according to the flow illustrated in FIG. 6 is recorded, and executes the process by executing the process according to the obtained program in the CPU of the data processing unit. Hereinafter, the process of each step of the flow illustrated in FIG. 6 will be described.

(Step S201)

First, the data processing unit of each communication apparatus executing the synchronizing process activates software which is a program executing the synchronizing process in step S201.

(Step S202)

Next, in step S202, for example, the data processing unit activates each apparatus executing the process necessary for executing the synchronizing process, such as a network processor configuring the communication unit.

(Step S203)

Next, in step S203, an activation setting of the network for executing the communication between the master and the slave is performed. Specifically, the process which enables communication between the master and the slave, such as a communication setting according to a communication protocol and a process obtaining a communication address, is executed.

(Step S204)

Next, the transmission and reception process of the synchronization packet is started. For example, the process is the synchronizing process accompanied by the transmission and reception process of each message packet between the master and the slave previously described with reference to FIG. 3.

Furthermore, the transmission and reception process of the synchronization packet in the embodiment to be described later is the transmission and reception process of the packet necessary for the clock synchronizing process executed between the master and the slave. The synchronization packet is transmitted from the master apparatus to the slave apparatus by setting one apparatus as the master apparatus and the other apparatus as the slave apparatus of the two communication apparatuses.

For example, when the clock synchronizing process according to the IEEE1588 sequence previously described is executed, the packet transmission and reception process of each PTP message transmitted and received between the master and the slave is executed. In this example, as previously described with reference to FIG. 3, for example, the synchronization packet transmission of 64 packets per one second is performed from the master apparatus to the slave apparatus.

(Step S205)

The slave apparatus executes the control for synchronizing the clock of the master apparatus with the clock of the slave apparatus by using the time information or the like of the synchronization packet transmitted from the master apparatus. This process is executed as the process according to the algorithm specified in the IEEE1588, for example, which is previously described with reference to FIGS. 1 to 3. If it is determined that the synchronization is established in the slave apparatus side, a notification packet denoting the synchronization establishment from the slave apparatus to the master apparatus is transmitted. The master apparatus confirms a successful synchronization establishment by receiving the notification packet.

If the confirmation is performed, the determination process of step S205 is "Yes", and the process proceeds to step S206.

(Step S206)

In step S205, after the synchronization establishment is confirmed, a process is started which transmits actual data to be actually transmitted and received between the communication apparatuses, for example an image and audio as video camera capturing contents, and stream data including other data, for example the stream data in which the time stamp of each image unit is set, from one communication apparatus to the other communication apparatus.

As illustrated in the flowchart, in the process of the present disclosure, before starting the transmission and reception of the actual data to be actually transmitted and received between the communication apparatuses, such as the image, the audio and the stream data including other data in step S206, the synchronizing process by the transmission and reception process of the synchronization packet is executed in step S204.

In other words, before the actual data transmission in which the variation of the transmission data volume is expected to occur is started, the synchronization packet is transmitted and received between two communication apparatuses (the master and the slave) during a non-transmission period of the actual data, and thereby the synchronizing process is configured to be executed in a network environment with less jitter. The synchronization packet transmission and reception is performed in such a stable communication environment, in other words, in a stable network environment with less varied network delay amount, thereby enabling a highly precise synchronizing process to be executed in a short time.

Figure 7:
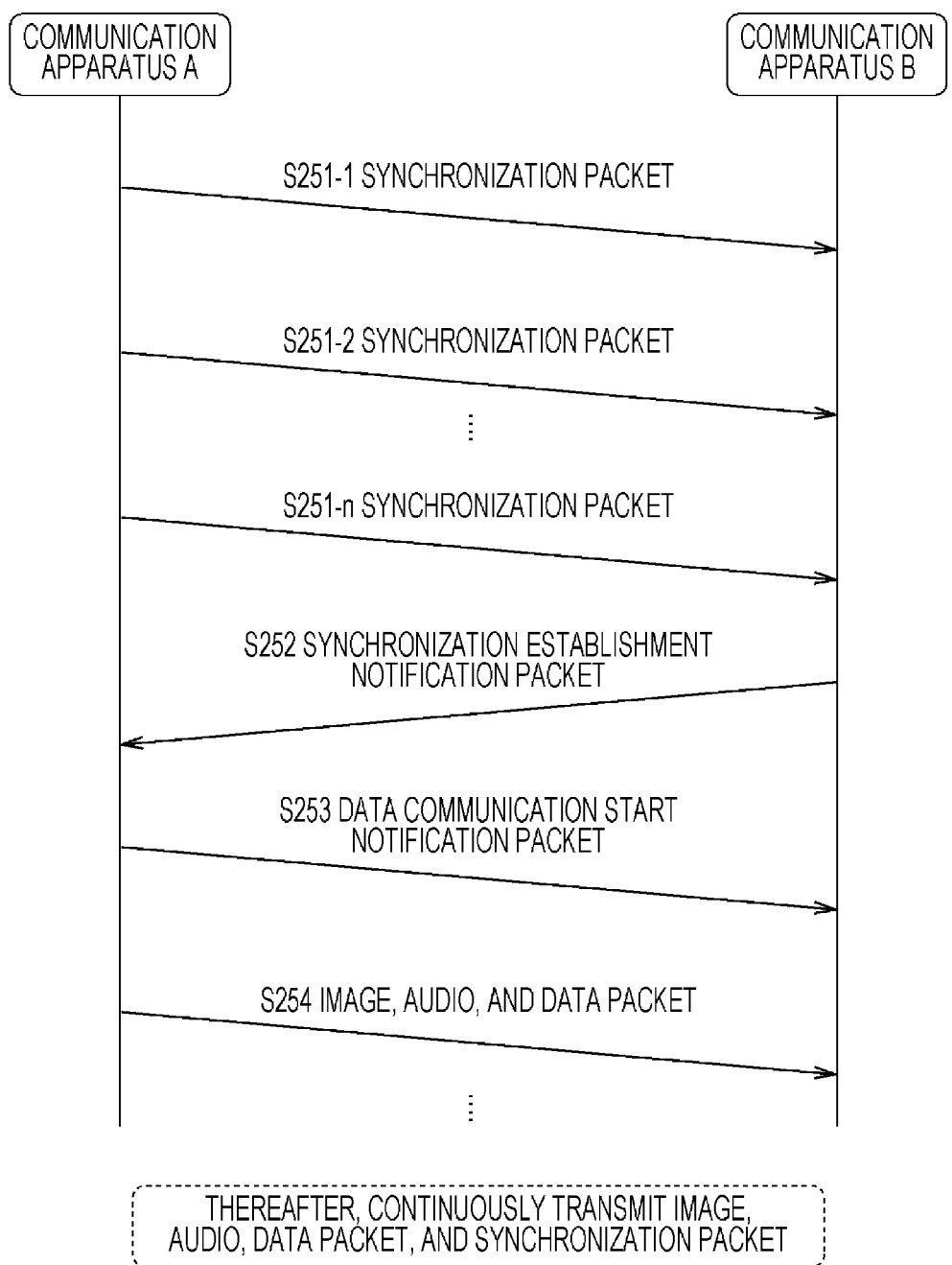
FIG. 7 is a sequence diagram illustrated with regard to an example of the process sequence of the clock synchronizing process according to the present disclosure.

The sequence diagram illustrated in FIG. 7 is a view illustrating a data transmission and reception sequence between the two communication apparatuses associated with the present disclosure according to the flow illustrated in FIG. 6.

When the synchronizing process is executed between the communication apparatuses A and B, the packets transmitted and received between each of the apparatuses are illustrated.

The communication apparatus A corresponds to the master apparatus and the communication apparatus B corresponds to the slave apparatus. In steps S251-1 to S251-n illustrated in FIG. 7, the synchronization packet is transmitted from the communication apparatus A which is the master apparatus to the communication apparatus B which is the slave apparatus. This process corresponds to the process of step S204 in the flow of FIG. 6. The communication apparatus A which is the master apparatus continuously transmits the communication packet at a frequency of 64 packets per second, for example. The communication apparatus B which is the slave apparatus receives the synchronization packet, and executes the synchronizing process by executing the same as the process previously described with reference to FIG. 3.

Furthermore, in FIG. 7, even though the packet transmission and reception process of steps S105 and S107 illustrated in FIG. 3 is omitted in FIG. 7, the message packet transmission is appropriately executed even by the communication apparatus B.

In steps S251-1 to S251-n illustrated in the sequence diagram of FIG. 7, the communication apparatus B which is the slave apparatus receives multiple synchronization packets from the communication apparatus A which is the master apparatus, and executes the synchronizing process by executing the same as the process previously described with reference to FIG. 3. If it is determined that the synchronization is established, the notification packet for notifying the synchronization establishment in step S252 is transmitted to the communication apparatus A which is the mater apparatus.

If the notification packet is received from the communication apparatus B which is the slave apparatus, the communication apparatus A which is the master apparatus confirms the synchronization establishment, and transmits the notification packet indicating that the transmission of the actual data such as the image data in step S253 is started to the communication apparatus B which is the slave apparatus. Further, in step 254, the communication apparatus A which is the master apparatus starts the transmission of the actual data such as image data with respect to the communication apparatus B which is the slave apparatus.

The processes of steps S252 to S254 correspond to the processes of steps S205 to S206 in the flowchart illustrated in FIG. 6. Furthermore, the transmission of the actual data in step S254 is continuously executed thereafter, furthermore, even the transmission and reception of the synchronization packet is continuously executed in parallel with the actual data delivery. The communication apparatus B which is the slave apparatus receives the synchronization packet received along with the actual data, continuously executes a synchronization control, and continuously executes the control for maintaining the synchronization.

As can be seen from the sequence illustrated in FIG. 7, the synchronization packet transmission of steps S251-1 to S251-n is executed in a stage before the transmission of the actual data such as image contents are started. Accordingly, the synchronization packet transmission and reception is executed in a stable communication environment with less communication load variation of the network, and thus it is possible to establish efficient synchronization in a short time.

Figure 8:
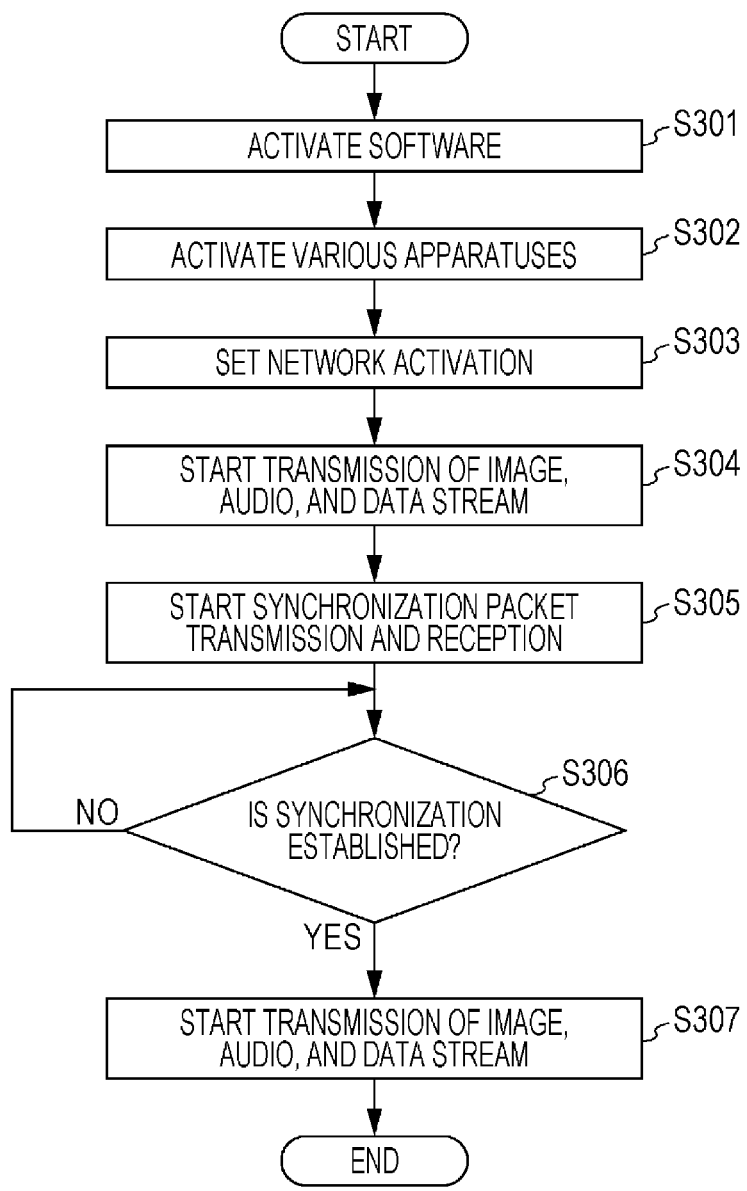
FIG. 8 is a view illustrating a flowchart described with regard to an example of the process sequence of the clock synchronizing process according to the present disclosure.

4. With Regard to Second Embodiment of Synchronizing Process According to Present Disclosure Next, the second embodiment of the synchronizing process according to the present disclosure will be described. FIG. 8 is a flowchart describing the processing sequence according to the second embodiment which is executed by the two communication apparatuses executing the clock synchronizing process, for example the master apparatus 110 and the slave apparatus 120 illustrated in FIG. 1.

The process according to the flow illustrated in FIG. 8 is executed in each data processing unit of the master apparatus 110 and the slave apparatus 120 illustrated in FIG. 8, for example. For example, the program in which the process sequence according to the flow illustrated in FIG. 8 is recorded is obtained from the memory, and the process is executed by executing the process according to the obtained program in the CPU of the data processing unit. Hereinafter, the process of each step of the flow illustrated in FIG. 8 will be described.

(Step S301)

First, the data processing unit of each communication apparatus which executes the synchronizing process activates the software which is the program executing the synchronizing process, in step S301.

(Step S302)

Next, in step S302, the data processing unit activates each apparatus which executes the process necessary for the synchronizing process, such as a network processor.

(Step S303)

Next, in step S303, the network activation setting for executing the communication between the master and the slave is performed. Specifically, the process enabling the communication between the master and the slave, such as the communication setting according to a communication protocol and a process obtaining a communication address, is executed. The processes of steps S301 to S303 are executed in the same processes as steps S201 to S203 of the flow of the first embodiment previously described with reference to FIG. 6.

(Step S304)

The process of step S304 is the process which is not included in the flow of the first embodiment previously described with reference to FIG. 6. In the second embodiment, test data is transmitted between the communication apparatuses in step S304, before the transmission of the synchronization packet is started in step S305, or along with the starting of the synchronization packet transmission. For example, the transmission of the test data including a test image, audio and data is started.

(Step S305)

In the present embodiment, the synchronization packet transmission and reception are started along with the test data transmission in step S305. The process is the synchronizing process accompanied by the synchronization packet transmission and reception between the master and the slave previously described with reference to FIG. 3, for example. For example, one apparatus of the two communication apparatuses is set as the master apparatus, and the other apparatus is set as the slave apparatus, thereby the synchronization packet being transmitted from the master apparatus to the slave apparatus. As previously described with reference to FIG. 3, for example, the synchronization packet transmission of 64 packets per second is performed from the master apparatus to the slave apparatus.

In the present embodiment, the synchronizing process accompanied by the synchronization packet transmission and reception is executed along with the test data transmission.

This is a measure to avoid a possible synchronization deviation because the network load rapidly increases when the actual data is transmitted.

In other words, after a certain situation with a certain degree of network load is set, the synchronization packet transmission and reception are performed, and the synchronizing process by the synchronization packet transmission and reception is executed by setting the situation close to the transmission time of the actual data started in step S307. Such a process is executed, and thereby it is possible to suppress the network load from rapidly varying when the actual data transmission which is started in step S307, and the synchronization deviation can be prevented from occurring when the actual data transmission is started.

(Step S306)

The processes of steps S306 to S307 are the same processes as the steps S205 to S206 of the flow of the first embodiment previously described with reference to FIG. 6. In the step S306, the slave apparatus executes the control for synchronizing the master apparatus clock with the slave apparatus clock by using the time information on the synchronization packet or the like received from the master apparatus. This process is executed as the process according to the algorithm specified in IEEE1588 previously described with reference to FIGS. 1 to 3, for example. If it is determined that the synchronization is established in the slave apparatus side, the notification packet indicating that the synchronization is established with respect to the master apparatus from the slave apparatus is transmitted.

The master apparatus confirms the successful synchronization establishment by receiving the notification packet. If the confirmation is performed, the determination process of step S306 is "Yes", and the process proceeds to step S307.

(Step S307)

In step S306, after the synchronization establishment is confirmed, the process is started which transmits actual data to be actually transmitted and received between the communication apparatuses for example the image, the audio as video camera capturing contents, and the stream data including other data from one communication apparatus to the other communication apparatus.

As illustrated in the flowchart, in the process of the present embodiment, the synchronization packet transmission and reception are executed in an environment in which the transmission and reception of the test data are performed.

With the process, it is possible to prevent the network load from rapidly varying when the actual data transmission is started, and the synchronization deviation can be prevented from occurring when the actual data transmission is started.

Figure 9:
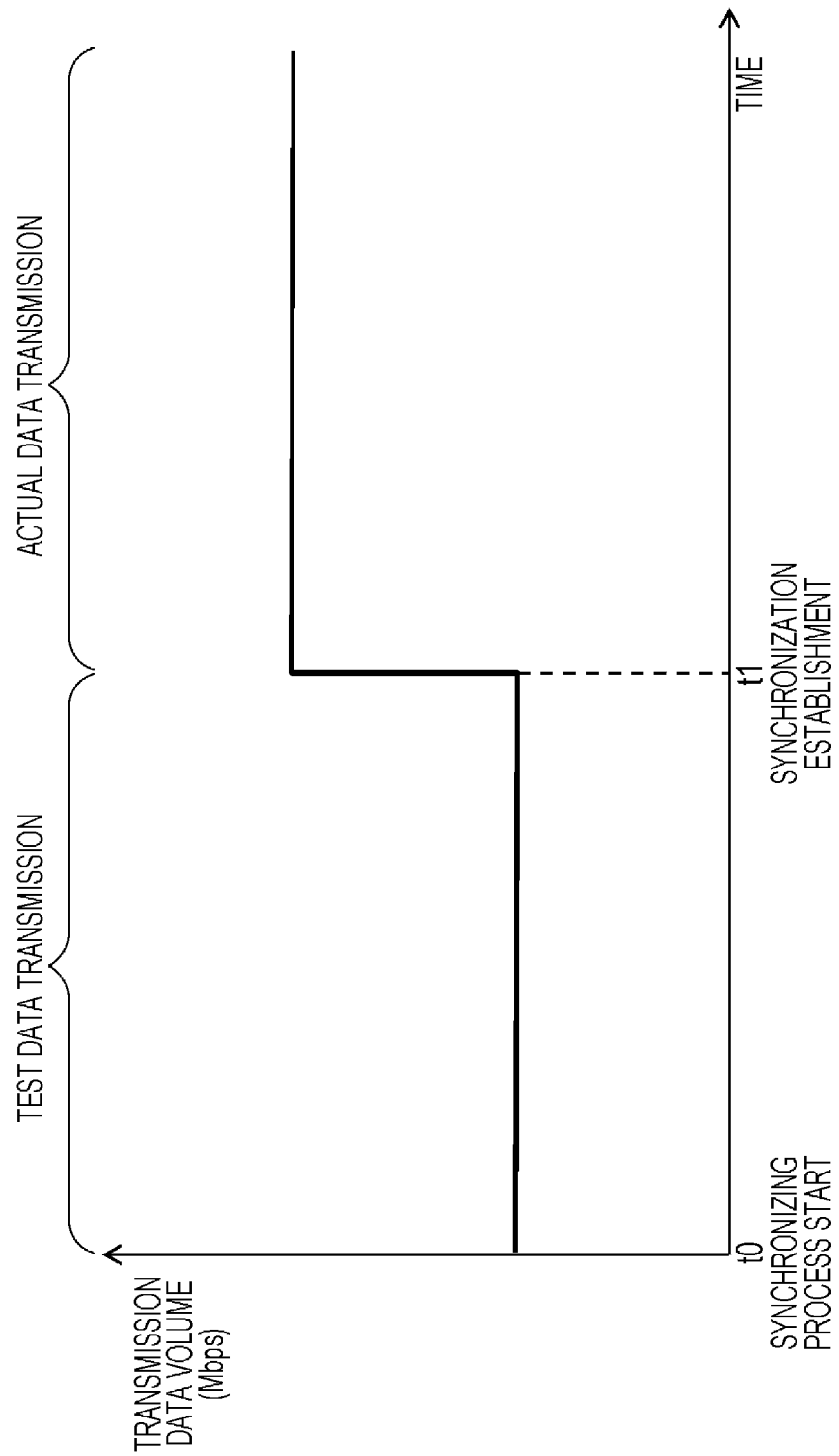
FIG. 9 is a view illustrated with regard to an example of a variation resulting from a time trend of transmission data volume in the clock synchronizing process according to the present disclosure.

FIG. 9 is a view illustrating an example of the time trend of the transmission data volume via the network in the present embodiment. The horizontal axis indicates the time and the vertical axis indicates the transmission data volume (Mbps). The time t0 to t1 is a transmission time of the test data, at this time the synchronization packet is transmitted along with the test data, and the synchronizing process is executed.

When the synchronization is established at time t2 in the slave apparatus, thereafter it proceeds to the transmission time of the actual data.

During the test data transmission period, the transmission data volume via the network is small compared to the actual data transmission period, but it is possible to reduce the difference with respect to the transmission data volume at the time of the actual data transmission by the test data transmission. In other words, it is possible to execute the synchronizing process in an environment similar to that of the substantial actual data transmission. Furthermore, the test data may be the data having a stable data volume in order to decrease the jitter. Specifically, data with a little variation such as still image data, black image data and color bar data, or audio data with a little variation, text data or the like may be used as the test data.

5. With Regard to Other Embodiment

Figure 10:
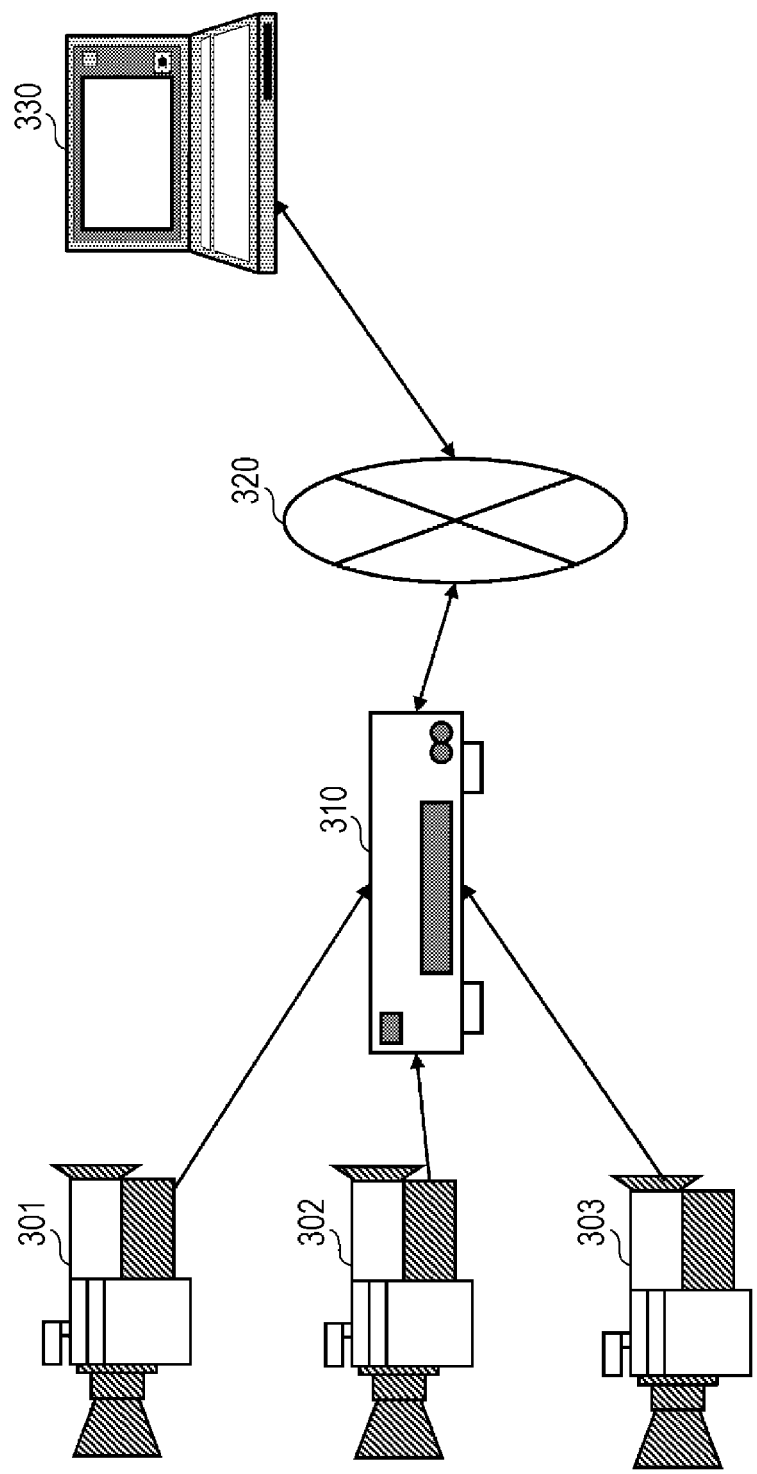
FIG. 10 is a view illustrated with regard to a configuration example of a system which executes the clock synchronizing process according to the present disclosure.

Next, other embodiment of the synchronizing process according to the process of the present disclosure will be described with reference to FIG. 10. FIG. 10 is a view illustrating a configuration example of a specific communication system. Three video cameras 301 to 303 are disposed at different positions, respectively, and for example, capture images of a soccer game played in a soccer stadium. The images are collected to a communication apparatus A310 in the stadium side.

Three video streams captured by three video cameras 301 to 303 are input to the communication apparatus A310. The communication apparatus A310 transmits them to a communication apparatus B330 via a network 320 by setting the time stamp according to the clock embedded in the communication apparatus A310 with respect to the three video streams.

In such a communication system, it is necessary to execute the clock synchronizing process between the communication apparatus A and the communication apparatus B. The synchronizing process can be executed as the process according to the first embodiment or the second embodiment preciously described. Hereinafter, a third embodiment different from the first and second embodiments will be further described.

In the third embodiment, the transmitting process of the test data in the step S304 of the flow illustrated in FIG. 8 in the second embodiment previously described is executed as a transmission step of multiple different data volumes. A transmitting process example of the specific test data will be described with reference to FIG. 11.

Figure 11:
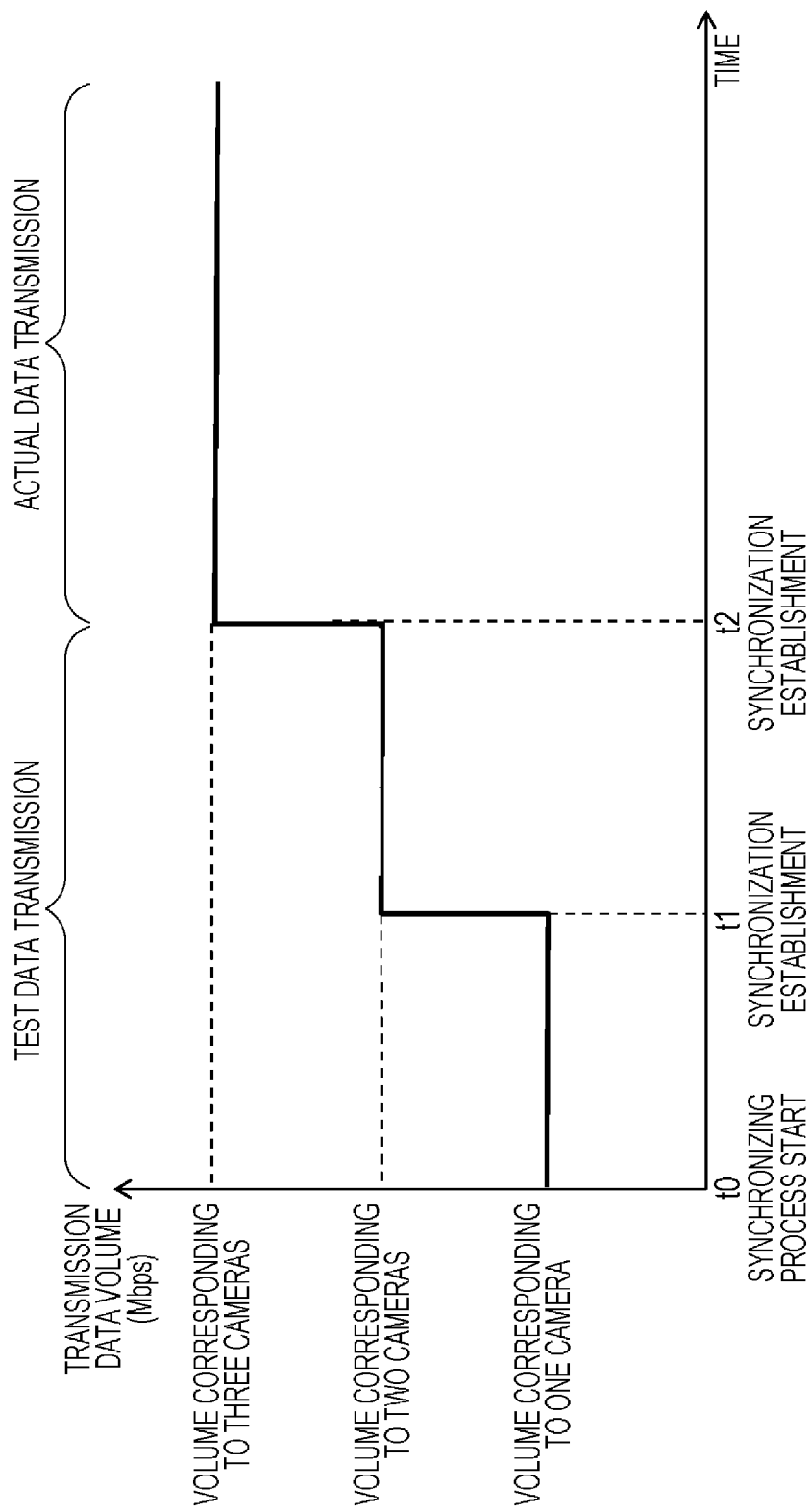
FIG. 11 is another view illustrated with regard to the example of a variation resulting from a time trend of the transmission data volume in the clock synchronizing process according to the present disclosure.

FIG. 11 is the same view as FIG. 9 previously described, and a view illustrating an example of the time trend of the transmission data volume via the network according to the present embodiment. The horizontal axis indicates the time, and the vertical axis indicates the transmission data volume (Mbps). The period of time t0 to t2 is the transmission period of the test data, the synchronization packet is transmitted along with the test data during this period, and the synchronizing process is executed.

In the present embodiment, only an image captured by one camera illustrated in FIG. 10, such as a video camera 301 is transmitted from the communication apparatus A310 to the communication apparatus B330 via the network 320 during the test data transmission period of the time t0 to t1. The camera image transmission period for the one camera is set as a first test data transmission period, and the synchronizing process is executed by transmitting the synchronization packet from the communication apparatus A310 to the communication apparatus B330.

At the time (t1), if the synchronization establishment is successful in the communication apparatus B330 for example, the communication apparatus B330 transmits the notification packet denoting the synchronization establishment to the communication apparatus A310. If the notification packet denoting the synchronization establishment is received from the communication apparatus B330, next, the communication apparatus A310 enters the second test data transmission period, and transmits the images captured by the two cameras as the test data. For example, the images captured by the video camera 301 and the video camera 302 illustrated in FIG. 10 are transmitted from the communication apparatus A310 to the communication apparatus B330 via the network 320. The camera image transmission period of the two cameras is set as a second test data transmission period, and a second synchronizing process is executed by transmitting the synchronization packet from the communication apparatus A310 to the communication apparatus B330.

At the time (t2), if the synchronization establishment is successful in the communication apparatus B330, the communication apparatus B330 transmits the notification packet denoting the synchronization establishment to the communication apparatus A310. If the notification packet denoting the synchronization establishment is received from the communication apparatus B330, the communication apparatus A310 starts the actual data transmission by finishing the test data transmission period.

The images captured by the three cameras are transmitted in the actual data transmitting process.

In this manner, at the time of the test data transmitting process, the synchronizing process is continuously executed by progressively increasing the transmission data via the network, thereby enabling a stable and secure synchronizing process to be smoothly executed.

Figure 12:
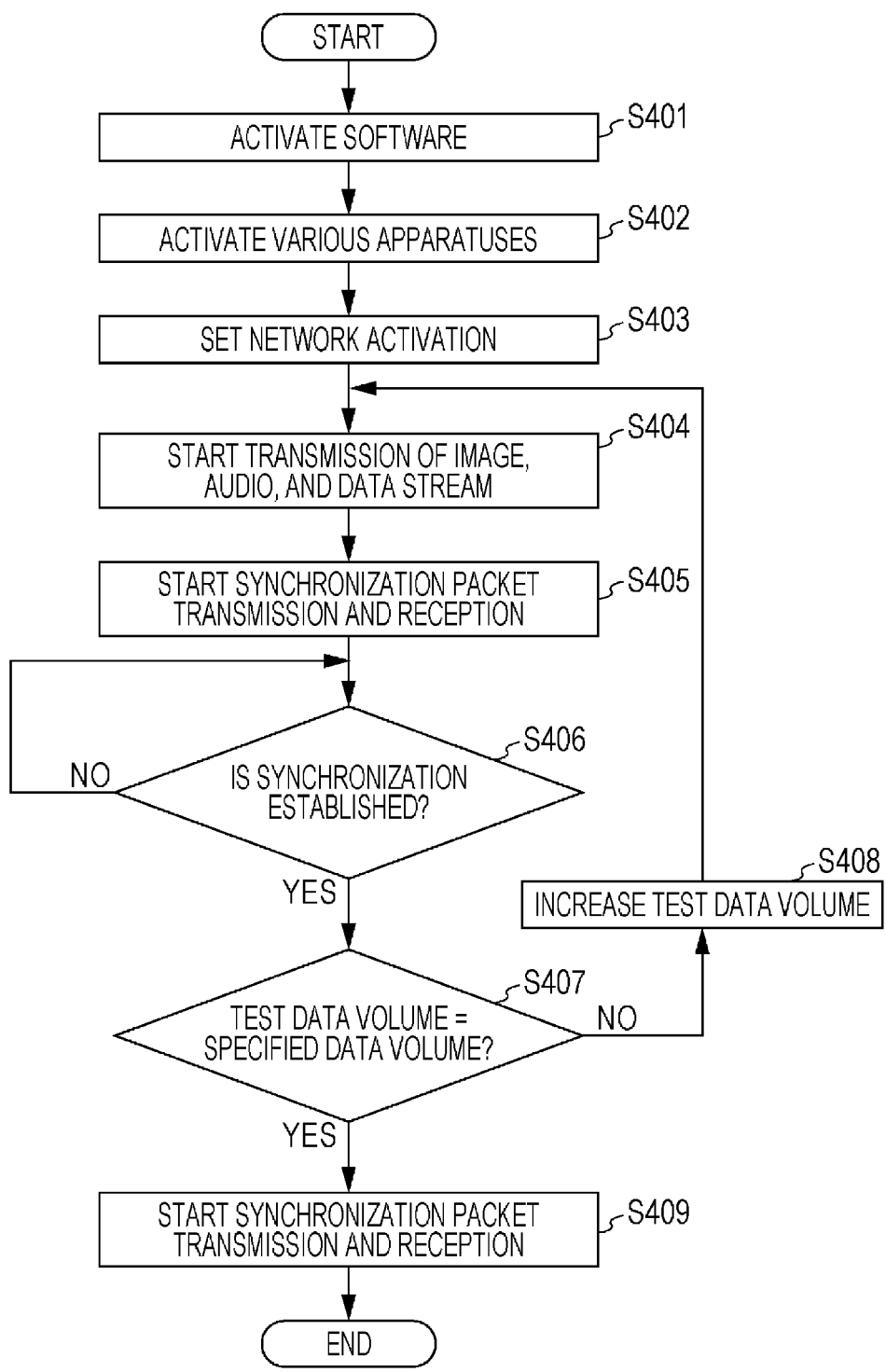
FIG. 12 is a view illustrating a flowchart described with regard to the example of the process sequence of the clock synchronizing process according to the present disclosure.

FIG. 12 is a flowchart describing the processing sequence of the clock synchronizing process according to the third embodiment. For example, it is the flowchart describing the processing sequence according to the third embodiment executed in the communication apparatus A310 and the communication apparatus B330 illustrated in FIG. 10.

Furthermore, the communication apparatus A310 and the communication apparatus B330 illustrated in FIG. 10 have the same configurations as the master apparatus 110 and the slave apparatus 120 illustrated in FIG. 1 previously described. The process according to the flow illustrated in FIG. 12 is executed in each data processing unit in the master apparatus 110 and the slave apparatus 120 illustrated in FIG. 1, for example. For example, the program in which the processing sequence according to the flow illustrated in FIG. 12 is recorded is obtained from the memory, and the process is executed by executing the process according to the program obtained in the CPU of the data processing unit. Hereinafter, the process of each apparatus of the flow illustrated in FIG. 12 will be described.

(Step S401)

First, the data processing unit of each communication apparatus which executes the synchronizing process activates the software which is the program executing the synchronizing process in step S401.

(Step S402)

Next, in step S402, the data processing unit activates each apparatus which executes the process necessary for executing the synchronizing process, such as the network processor configuring the communication unit.

(Step S403)

Next, in step S403, the activation setting of the network for executing the communication between the master and the slave is performed. Specifically, the process enabling the communication between the master and the slave, such as the communication setting according to the communication program and the process obtaining the communication address, is executed. The processes of these steps S401 to S403 are the same processes as the steps S201 to S203 of the flow of the first embodiment previously described with reference to FIG. 6.

(Step S404)

The process of step S404 is the same test data transmission process as the step S304 in the flow of the second embodiment previously described with reference to FIG. 8. However, in the present embodiment, the test data transmission process is divided into other multiple circlings to be executed. In other words, the process in which the data volume is progressively increasing is executed. First, in the first stage, a minimum data volume such as the data captured by one camera is transmitted as the test data.

(Step S405)

In step S405, the synchronization packet transmission and reception are started along with the test data transmission. For example, the process is the synchronizing process accompanied by the synchronization packet transmission and reception between the master and the slave previously described with reference to FIG. 3. For example, one of the two communication apparatuses is the master apparatus and the other is the slave apparatus, and the synchronization packet is transmitted from the master apparatus to the slave apparatus. As previously described with reference to FIG. 3, for example, the synchronization packet transmission of 64 packets per second is performed from the master apparatus to the slave apparatus.

(Step S406)

In step S406, the slave apparatus performs the control for synchronizing the clock of the slave apparatus with the clock of the master apparatus by using the time information on the synchronization packet or the like received from the master apparatus. This process is executed as the process according to the algorithm specified in the IEEE1588 previously described with reference to FIGS. 1 to 3, for example. If it is determined that the synchronization is established in the slave apparatus side, the notification packet denoting the synchronization establishment is transmitted from the slave apparatus to the master apparatus. The master apparatus confirms the successful synchronization establishment by receiving the notification packet. If the confirmation is made, the determination process of the step S406 is "Yes", and then the process proceeds to step S407.

(Step S407)

In step S407, it is determined whether or not the test data volume reaches the maximum test data volume specified in advance.

For example, in the example described with reference to FIG. 11, the test data volume is the data captured by two cameras.

At this time, since the synchronization is established under the transmission of the data captured by one camera only, the determination of step S407 is "No", and the process proceeds to step S408.

(Step S408)

In step S408, a test data increasing process is executed. For example, in the example described with reference to FIGS. 1 and 11, the process which sets the image data captured by the two cameras as the test data is executed.

(Steps S404 to S406)

Then, the synchronizing process of the steps S404 to S406 is executed under the test data transmission of the two cameras.

This process corresponds to the process of the time (t1) to (t2) in the example illustrated in FIG. 11. If the synchronizing process succeeds under the network environment in which the image data captured by the two cameras is set as the test data in the step S406, the process proceeds to the step S407.

(Step S407)

In the step S407, it is determined whether or not the test data volume reaches the most test data volume specified in advance.

At this time, the synchronization is established under the transmission of the data captured by the two cameras, it is determined that the test data volume reached the most test data volume specified in advance, and the process proceeds to step S409.

(Step S409)

In step S409, the transmission of the actual data to be substantially transmitted and received between the communication apparatuses is started. For example, in the example illustrated in FIG. 10, the process is started which transmits the image, the audio which are contents captured by the three video cameras 301 to 303, and three pieces of stream data including other data from the communication apparatus A310 to the communication apparatus B330.

In the present embodiment, in this manner the synchronizing process accompanied by the synchronization packet transmission and reception is executed along with the test data transmission, and the process which progressively increases the transmission data volume of the test data is executed. This process can prevent the synchronization deviation due to the rapidly increased network load when the actual data transmission is started.

Furthermore, as an example of the test data increasing process, the example is described in which the process increasing the stream number of the image captured by the camera is executed, however, in another embodiment, the test data may be set to be increased. For example, it is possible to set the following items.

(1) The test data volume is increased from the data coded with a high compression ratio to the data coded with a progressively lowered compression ratio.

(2) The data volume is gradually increased by changing a sampling process of the camera capturing image.

(3) In an initial stage, SD image data is transmitted as the first test data, and in the second stage, HD image data is transmitted as the second test data.

(4) In the initial stage at the time of transmitting the test data, cull rate of the transmission packet is highly set, and the cull rate is lowered at the time of transmitting the second half of the test data, thereby gradually allowing the cull rate to be even the actual data is transmitted.

For example, in the setting described above, it is possible to set so as to gradually increase the transmission data volume at the time of transmitting the test data. In addition, the increasing of the transmission data volume during the test data transmission period is not limited to a stepwise increasing process as illustrated in FIG. 11, and for example, a smooth increasing process may be set as illustrated in FIG. 13. In addition, as illustrated in FIG. 14, when the actual data transmission is started after the test data transmission period is completed, the progressively increasing the transmission data volume may be set. For example, this process is the process in which the data with a high compression ratio is transmitted in the initial stage of the test data transmission and thereafter the data with a progressively lowered compression ratio is transmitted, or the SD image data is transmitted in the initial stage of the actual data transmission, and thereby this process can be realized by switching the SD image to the HD image after a certain period of time.

In addition, in the embodiment described above, the example of the synchronization establishment process is described before the actual data transmission is started, however, after the actual data is transmitted, similarly even in a case where resynchronization is performed, first of all, non-transmission period of the actual data is set by stopping the transmission of the actual data which is substantial transmission data, such as the image, the audio and the data, the synchronization is established after returning to the situation having a little jitter by reducing the network load, and again, the process in which the transmission of the actual data (the image, the audio and the data) is restarted may be executed.

In addition, the transmission of the actual data (the image, the audio and the data) is not completely stopped, the number of the images and the audio being transmitted is reduced, and the data transmission amount of the network is decreased, thereby re-establishing the synchronization therebetween, and thereafter, the process which restarts the transmission of the image, the audio, and the data may be performed. In addition, a codec rate of the actual data (the image, the audio data or the like), in other words, the coding rate during the transmission is decreased, and the data transmission amount of the network is reduced, thereby re-establishing the synchronization therebetween, and thereafter, the setting such as restarting the transmission of the image, the audio and the data may be performed.

6. Summary of Configuration of Present Disclosure

As described above, with reference to a specified embodiment, the embodiments of the present disclosure are described in detail. However, in a scope without departing from gist of the present disclosure, it is apparent that those skilled in the art can make modification and substitution of the embodiment. In other words, the present disclosure is disclosed in an exemplary form, and it should not be interpreted to a limited extent. In order to determine the gist of the present disclosure, the scope of the claims should be referred.

Furthermore, a technology disclosed in the present specification can take following configurations.

(1) A communication apparatus includes a data processing unit that executes a clock synchronizing process between a host apparatus and a communication partner apparatus; and a communication unit that executes a communication with the communication partner apparatus, wherein the data processing unit executes the clock synchronizing process accompanied by a synchronization packet transmission and reception with the communication partner apparatus during a non-transmission period of actual data scheduled to be transmitted to the communication partner apparatus, and wherein the data processing unit starts an actual data transmission with respect to the communication partner apparatus after synchronization is established by the clock synchronizing process.

(2) The communication apparatus according to (1), wherein the data processing unit executes the clock synchronizing process accompanied by the synchronization packet transmission and reception with the communication partner apparatus before the actual data transmission starts, and wherein the data processing unit executes the actual data transmission with respect to the communication partner apparatus after the synchronization is established by the clock synchronizing process.

(3) The communication apparatus according to (1) or (2), wherein the data processing unit temporarily stops the actual data transmission after the actual data transmission starts, wherein the data processing unit executes the clock synchronizing process accompanied by the synchronization packet transmission and reception with respect to the communication partner apparatus during a temporary stop period of the actual data transmission, and wherein the data processing unit restarts the actual data transmission with respect to the communication partner apparatus after the synchronization is established by the clock synchronizing process.

(4) The communication apparatus according to (1) to (3), wherein the data processing unit starts the actual data transmission under a condition that a notification packet denoting synchronization establishment is received from the communication partner apparatus.

(5) The communication apparatus according to (1) to (4), wherein the data processing unit executes a data transmission and reception process only for a packet used for a synchronizing process applied to the clock synchronizing process during an execution period of the clock synchronizing process.

(6) The communication apparatus according to (1) to (4), wherein the data processing unit transmits and receives a packet used for a synchronizing process applied to the clock synchronizing process and a test data packet storing test data during an execution period of the clock synchronizing process.

(7) The communication apparatus according to (6), wherein the data processing unit sequentially increases a data volume of the test data during the execution period of the clock synchronizing process.

(8) The communication apparatus according to (6) or (7), wherein the actual data is configured by a plurality of items of image data captured by a plurality of cameras, and wherein the data processing unit uses partial items of the captured image data selected from the plurality of items of image data captured by the plurality of cameras, as the test data.

(9) The communication apparatus according to (1) to (8), wherein the actual data is data in which image data is included.

(10) The communication apparatus according to (1) to (9), wherein the actual data is data in which a time stamp is set.

(11) The communication apparatus according to (1) to (10), wherein the data processing unit executes the clock synchronizing process according to a sequence specified in IEEE1588.

(12) A communication apparatus includes a data processing unit that executes a clock synchronizing process between a host apparatus and a communication partner apparatus; and a communication unit that executes communication with the communication partner apparatus, wherein the data processing unit executes the clock synchronizing process accompanied by a synchronization packet transmission and reception with the communication partner apparatus during a non-reception period of actual data scheduled to be received from the communication partner apparatus, and wherein the data processing unit starts an actual data reception from the communication partner apparatus after synchronization is established by the clock synchronizing process.

(13) The communication apparatus according to (12), wherein the data processing unit starts the actual data reception after a notification establishment denoting a synchronization packet is transmitted with respect to the communication partner apparatus.

(14) The communication apparatus according to (12) OR (13), wherein the data processing unit executes a data transmission and reception process only for a packet used for a synchronizing process applied to the clock synchronizing process during an execution period of the clock synchronizing process.

(15) The communication apparatus according to (12) OR (13), wherein the data processing unit transmits and receives the packet used for a synchronizing process applied to the clock synchronizing process and a test data packet storing test data during an execution period of the clock synchronizing process.

(16) A communication system includes a first communication apparatus; and a second communication apparatus that executes communication with the first communication apparatus, wherein the first communication apparatus executes a clock synchronizing process accompanied by a synchronization packet transmission and reception with the second communication apparatus during a non-transmission period of actual data scheduled to be transmitted to the second communication apparatus, wherein the second communication apparatus executes the clock synchronizing process to which a synchronization packet is applied during a non-reception period of the actual data, and transmits a notification packet denoting synchronization establishment to the first communication apparatus after synchronization is established, and wherein the first communication apparatus starts an actual data transmission with respect to the second communication apparatus according to notification packet reception from the second communication apparatus.

(17) A first apparatus, including:
at least one processor programmed to:
communicate first data between the first apparatus and second apparatus via a network;
communicate, while at least a portion of the first data is being communicated via the network, a synchronization packet between the first apparatus and the second apparatus; and
communicate second data between the first apparatus and the second apparatus after synchronization between the first apparatus and the second apparatus has been established.

(18) The first apparatus of (17), wherein communicating first data between the first apparatus and the second apparatus comprises transmitting the first data from the first apparatus to the second apparatus.

(19) The first apparatus of (17), wherein communicating first data between the first apparatus and the second apparatus comprises receiving the first data by the first apparatus from the second apparatus.

(20) The first apparatus of (17), wherein communicating the synchronization packet between the first apparatus and the second apparatus comprises transmitting the synchronization packet from the first apparatus to the second apparatus.

(21) The first apparatus of (17), wherein communicating the synchronization packet between the first apparatus and the second apparatus comprises receiving the synchronization packet by the first apparatus from the second apparatus.

(22) The first apparatus of (17), further including:
receiving an indication that synchronization between the first apparatus and the second apparatus has been established; and
wherein the communicating the second data is performed in response to receiving the indication.

(23) The first apparatus of (17), wherein the first data is image data.

(24) The first apparatus of (17), wherein communicating the first data between the first apparatus and the second apparatus comprises communicating the first data using a substantially stable data volume.

(25) The first apparatus of (17), wherein communicating the first data between the first apparatus and the second apparatus comprises communicating the first data using multiple different data volumes.

(26) The first apparatus of (25), wherein communicating the first data using multiple different data volumes comprises communicating the first data using a first substantially stable data volume for a first period of time and communicating the first data using a second substantially stable data volume for a second period of time after the first period of time, wherein the first substantially stable data volume and the second substantially data volume are different.

(27) The first apparatus of (25), wherein communicating the first data using multiple different data volumes comprises communicating the first data using a variable data volume that increases during a time period during which at least a portion of the first data is communicated.

(28) The first apparatus of (17), wherein communicating the second data comprises communicating the second data using a first data volume that increases to a second data volume over a predetermined period of time.

(29) The first apparatus of (17), wherein communicating the synchronization packet comprises communicating the synchronization packet in accordance with a clock synchronization processing sequence specified in IEEE 1588.

(30) The first apparatus of (17), wherein the at least one processor is further programmed to:
halt communication of the second data between the first apparatus and the second apparatus;
re-establish synchronization between the first apparatus and the second apparatus; and
resume communication of the second data between the first apparatus and the second apparatus after synchronization between the first apparatus and the second apparatus has been re-established.

(31) The first apparatus of (17), wherein the second data is communicated between the first apparatus and the second apparatus using a first data volume, and wherein the at least one processor is further programmed to:
reduce the first data volume of the second data communicated between the first apparatus and the second apparatus to a second data volume;
re-establish synchronization between the first apparatus and the second apparatus; and
resume communication of the second data between the first apparatus and the second apparatus at the first data volume after synchronization between the first apparatus and the second apparatus has been re-established.

(32) The first apparatus of (17), wherein communicating the synchronization packet between the first apparatus and the second apparatus comprises initiating a communication of the synchronization packet at a point in time after at least a portion of the first data is communicated between the first apparatus and the second apparatus.

(33) A first apparatus, including:
a network interface configured to communicate with a second apparatus via a network; and
at least one processor programmed to:
transmit first data to the second apparatus via the network interface;
communicate, while at least a portion of the first data is being transmitted, a synchronization packet between the first apparatus and the second apparatus via the network interface; and
transmit second data to the second apparatus after synchronization between the first apparatus and the second apparatus has been established.

(34) A first apparatus, including:
a network interface configured to communicate with a second apparatus via a network; and
at least one processor programmed to:
receive, via the network interface, first data sent from the slave apparatus;
communicate, while at least a portion of the test data is being received via the network interface, a synchronization packet between the first apparatus and the second apparatus; and
receive second data from the second apparatus after synchronization between the first apparatus and the second apparatus has been established.

(35) A method of synchronizing a clock of a first apparatus and a clock of a second apparatus in communication with the first apparatus via a network, the method including:
transmitting first data from the first apparatus to the second apparatus via the network;
communicating, while at least a portion of the first data is being transmitted, a synchronization packet between the first apparatus to the second apparatus via the network; and transmitting second data from the first apparatus to the second apparatus after synchronization between the first apparatus and the second apparatus has been established.

(36) A method of synchronizing a clock of a first apparatus and a clock of a second apparatus in communication with the first apparatus via a network, the method including:
receiving, by the first apparatus, first data sent from the second apparatus via the network;
communicating, while at least a portion of the first data is being received, a synchronization packet between the first apparatus and the second apparatus via the network; and
receiving second data from the second apparatus after synchronization between the first apparatus and the second apparatus has been established.

Further, a processing method of executing in the above-described apparatus and the system, or the program executing the process is also included in the configuration of the present disclosure.

In addition, a series of processes described in the specification can be executed by hardware, software or a combination configuration of both. When the process is executed by the software, the program in which the processing sequence is recorded is executed by being installed in the memory built into a dedicated hardware in a computer, or it is possible to execute by installing the program in a general-purpose computer in which various processes can be executed. For example, the program can be recorded in advance in a recording medium. Besides being installed from the recording medium to the computer, the program is received via a network such as LAN (Local Area Network) or the internet, and can be installed in the recording medium such as an embedded hard disc.

Furthermore, various processes described in the specification may not only be executed in time series according to the description, but may be executed in parallel or individually according to a processing capability of the apparatus executing the process or when necessary. In addition, the system in the present specification is a logical collection configuration of multiple apparatuses, and the apparatus of each configuration is not limited to those within the same housing.

The present disclosure contains subject matter related to that disclosed in Japanese Priority Patent Application JP 2012-136457 filed in the Japan Patent Office on Jun. 16, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

INDUSTRIAL APPLICABILITY

As described above, according to the configuration of the embodiment of the present disclosure, an efficient clock synchronizing process is realized between the communication apparatuses via the network. Specifically, the clock synchronizing process is executed as follows between the first communication apparatus and the second communication apparatus which communicate via the network. In other words, the first communication apparatus executes the synchronizing process accompanied by the synchronization packet transmission and reception with the second communication apparatus, during the non-transmission period of the actual data such as the image contents to be transmitted to the second communication apparatus. The second communication apparatus executes the clock synchronizing process to which the synchronization packet is applied during the non-reception period of the actual data, and after the synchronization is established, the notification packet indicating the synchronization establishment is transmitted to the first communication apparatus. The first communication apparatus starts the transmission of the actual data such as the image contents with respect to the second communication apparatus, depending on the notification packet received from the second communication apparatus. This configuration enables the synchronizing process to be executed in a stable situation with less network load and less network delay fluctuation (the jitter).

REFERENCE SIGNS LIST

110 Master apparatus
111 Master clock
112 Counter
113 Data processing unit
114 Communication unit
115 Master clock signal
120 Slave apparatus
121 Slave clock
122 Counter
123 Data processing unit
124 Communication unit
125 Slave clock signal
301 to 303 Video camera
310 Communication apparatus A
320 Network
330 Communication apparatus B

The invention claimed is:
1. A first apparatus, comprising:
at least one processor configured to:
communicate multiple first data at multiple different data volumes between the first apparatus and a second apparatus via a network;
communicate, while at least a portion of each of the multiple first data is communicated via the network, respective ones of multiple synchronization packets between the first apparatus and the second apparatus; and
communicate second data between the first apparatus and the second apparatus after synchronization between the first apparatus and the second apparatus has been established based on the multiple synchronization packets.

2. The first apparatus of claim 1, wherein the communication of the multiple first data between the first apparatus and the second apparatus comprises transmission of the multiple first data from the first apparatus to the second apparatus.

3. The first apparatus of claim 1, wherein the communication of the multiple first data between the first apparatus and the second apparatus comprises reception of the multiple first data by the first apparatus from the second apparatus.

4. The first apparatus of claim 1, wherein the communication of the multiple synchronization packets between the first apparatus and the second apparatus comprises transmission of the multiple synchronization packets from the first apparatus to the second apparatus.

5. The first apparatus of claim 1, wherein the communication of the multiple synchronization packets between the first apparatus and the second apparatus comprises reception of the multiple synchronization packets by the first apparatus from the second apparatus.

6. The first apparatus of claim 1,
wherein the at least one processor is further configured to receive an indication that the synchronization between the first apparatus and the second apparatus has been established; and
wherein the communication of the second data is based on receipt of the indication.

7. The first apparatus of claim 1, wherein the multiple first data is image data.

8. The first apparatus of claim 1, wherein the communication of the multiple first data between the first apparatus and the second apparatus comprises communication of the multiple first data at a stable data volume.

9. The first apparatus of claim 1, wherein the communication of the multiple first data at multiple different data volumes comprises communication of test data at a first stable data volume for a first period of time and communication of the test data at a second stable data volume for a second period of time after the first period of time, wherein the first stable data volume and the second stable data volume are different.

10. The first apparatus of claim 1, wherein the communication of the multiple first data at multiple different data volumes comprises communication of test data at a variable data volume that increases in a time period within which at least a portion of the test data is communicated.

11. The first apparatus of claim 1, wherein the communication of the respective ones of multiple synchronization packets comprises communication of the multiple synchronization packets based on a clock synchronization process sequence specified in IEEE 1588.

12. The first apparatus of claim 1, wherein the at least one processor is further configured to:
halt communication of the second data between the first apparatus and the second apparatus;
re-establish the synchronization between the first apparatus and the second apparatus; and
resume communication of the second data between the first apparatus and the second apparatus after the synchronization between the first apparatus and the second apparatus has been re-established.

13. The first apparatus of claim 1, wherein the second data is communicated between the first apparatus and the second apparatus at a first data volume, and wherein the at least one processor is further configured to:
reduce the first data volume of the second data communicated between the first apparatus and the second apparatus to a third data volume;
re-establish the synchronization between the first apparatus and the second apparatus; and
resume communication of the second data between the first apparatus and the second apparatus at the first data volume after the synchronization between the first apparatus and the second apparatus has been re-established.

14. The first apparatus of claim 1, wherein the communication of the respective ones of multiple synchronization packets between the first apparatus and the second apparatus comprises initiation of a communication of the respective ones of multiple synchronization packets at a point in time after at least a portion of each of the multiple first data is communicated between the first apparatus and the second apparatus.

15. The first apparatus of claim 1, wherein the communication of the second data comprises communication of the second data at a first data volume that increases to a second data volume over a period of time.

16. A first apparatus, comprising:
a network interface configured to communicate with a second apparatus via a network; and
at least one processor configured to:
transmit multiple first data to the second apparatus via the network interface at multiple different data volumes;
communicate, while at least a portion of each of the multiple first data is transmitted, respective ones of multiple synchronization packets between the first apparatus and the second apparatus via the network interface; and
transmit second data to the second apparatus after synchronization between the first apparatus and the second apparatus has been established based on the multiple synchronization packets.

17. A first apparatus, comprising:
a network interface configured to communicate with a second apparatus via a network; and
at least one processor configured to:
receive, via the network interface, multiple first data sent from the second apparatus at multiple different data volumes;
communicate, while at least a portion of each of the multiple first data is received via the network interface, respective ones of multiple synchronization packets between the first apparatus and the second apparatus; and
receive second data from the second apparatus after synchronization between the first apparatus and the second apparatus has been established based on the multiple synchronization packets.

18. A method, comprising:
synchronizing a first clock of a first apparatus and a second clock of a second apparatus in communication with the first apparatus via a network, the synchronizing comprising:
transmitting multiple first data from the first apparatus to the second apparatus via the network at multiple different data volumes;
communicating, while at least a portion of each of the multiple first data is transmitted, respective ones of multiple synchronization packets between the first apparatus to the second apparatus via the network; and
transmitting second data from the first apparatus to the second apparatus after synchronization between the first apparatus and the second apparatus has been established based on the multiple synchronization packets.

19. A method, comprising:
synchronizing a first clock of a first apparatus and a second clock of a second apparatus in communication with the first apparatus via a network, the synchronizing comprising:
receiving, by the first apparatus, multiple first data sent from the second apparatus via the network at multiple different data volumes;
communicating, while at least a portion of each of the multiple first data is received, respective ones of multiple synchronization packets between the first apparatus and the second apparatus via the network; and receiving second data from the second apparatus after synchronization between the first apparatus and the second apparatus has been established based on the multiple synchronization packets.

* * * * *